(12) United States Patent
Stochino

(10) Patent No.: US 11,675,051 B2
(45) Date of Patent: *Jun. 13, 2023

(54) PERCEPTION SYSTEMS FOR USE IN AUTONOMOUSLY CONTROLLING SYSTEMS

(71) Applicant: Perceptive Inc., Redwood City, CA (US)

(72) Inventor: Alberto Stochino, Menlo Park, CA (US)

(73) Assignee: Perceptive Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,826

(22) Filed: Feb. 23, 2022

(65) Prior Publication Data

US 2022/0179053 A1 Jun. 9, 2022

Related U.S. Application Data

(63) Continuation of application No. 16/998,409, filed on Aug. 20, 2020, which is a continuation of application No. 16/599,822, filed on Oct. 11, 2019, now Pat. No. 10,754,011, which is a continuation-in-part of application No. 16/298,752, filed on Mar. 11, 2019, now Pat. No. 10,444,366.

(Continued)

(51) Int. Cl.
| | |
|---|---|
| *G01C 3/08* | (2006.01) |
| *G01S 7/481* | (2006.01) |
| *G01S 7/48* | (2006.01) |
| *G01S 17/08* | (2006.01) |

(52) U.S. Cl.
CPC .......... *G01S 7/4814* (2013.01); *G01S 7/4808* (2013.01); *G01S 17/08* (2013.01)

(58) Field of Classification Search
CPC ....... G01S 7/4814; G01S 7/4808; G01S 17/08
See application file for complete search history.

(56) References Cited

U.S. PATENT DOCUMENTS

| | | | |
|---|---|---|---|
| 4,466,738 A | | 8/1984 | Huang et al. |
| 6,580,497 B1 * | | 6/2003 | Asaka ..................... G01S 7/493 |
| | | | 356/28.5 |

(Continued)

FOREIGN PATENT DOCUMENTS

| | | |
|---|---|---|
| EP | 2 626 722 A1 | 8/2013 |
| EP | 2 963 445 A2 | 1/2016 |

(Continued)

OTHER PUBLICATIONS

Invitation to Pay Additional Fees dated Sep. 25, 2019 in PCT Application No. PCT/US2019/037640.

(Continued)

*Primary Examiner* — Mark Hellner
(74) *Attorney, Agent, or Firm* — Knobbe, Martens, Olson & Bear, LLP

(57) ABSTRACT

A lidar sensor comprising a laser, an optical sensor, and a processor. The lidar sensor can determine a distance to one or more objects. The lidar sensor can optionally embed a code in beams transmitted into the environment such that those beams can be individually identified when their corresponding reflection is received.

30 Claims, 23 Drawing Sheets

Related U.S. Application Data

(60) Provisional application No. 62/692,417, filed on Jun. 29, 2018.

(56) References Cited

U.S. PATENT DOCUMENTS

| | | | |
|---|---|---|---|
| 6,646,723 B1 * | 11/2003 | Dubovitsky | G01S 7/4915 356/485 |
| 6,714,286 B1 | 3/2004 | Wheel | |
| 10,444,366 B1 * | 10/2019 | Stochino | G01S 17/08 |
| 10,754,011 B2 | 8/2020 | Stochino | |
| 2010/0318319 A1 | 12/2010 | Maerhofer | |
| 2014/0333468 A1 | 11/2014 | Zhu et al. | |
| 2017/0038464 A1 * | 2/2017 | Campbell | G01S 17/32 |
| 2017/0214746 A1 | 7/2017 | Zettler et al. | |
| 2017/0329010 A1 | 11/2017 | Warke et al. | |
| 2018/0102858 A1 | 4/2018 | Tiwari et al. | |
| 2018/0188371 A1 | 7/2018 | Bao et al. | |
| 2019/0257927 A1 | 8/2019 | Yao | |
| 2019/0391242 A1 | 12/2019 | Asghari et al. | |

FOREIGN PATENT DOCUMENTS

| | | |
|---|---|---|
| JP | 2000147100 A | 5/2000 |
| WO | WO 2017/216581 A1 | 12/2017 |
| WO | WO 2020/005641 A1 | 1/2020 |

OTHER PUBLICATIONS

International Search Report dated Nov. 20, 2019 in PCT Application No. PCT/US2019/037640; 23 pages.
International Preliminary Report on Patentability dated Dec. 29, 2020 in Application No. PCT/US2019/037640.
"Kazuhisa Okamoto, Pulse Doppler radar apparatus, 2000" (Year 2000).

* cited by examiner

PERCEPTION SYSTEMS FOR USE IN AUTONOMOUSLY CONTROLLING SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a continuation of U.S. patent application Ser. No. 16/998,409, filed Aug. 20, 2020, entitled "PERCEPTION SYSTEMS FOR USE IN AUTONOMOUSLY CONTROLLING SYSTEMS," which is a continuation of U.S. patent application Ser. No. 16/599,822, filed Oct. 11, 2019, entitled "PERCEPTION SYSTEMS FOR USE IN AUTONOMOUSLY CONTROLLING SYSTEMS," now U.S. Pat. No. 10,754,011, which is a continuation-in-part of U.S. patent application Ser. No. 16/298,752, filed Mar. 11, 2019, entitled "PERCEPTION SYSTEMS FOR USE IN AUTONOMOUSLY CONTROLLING SYSTEMS," now U.S. Pat. No. 10,444,366, which claims priority benefit under 35 U.S.C. § 119(e) to U.S. Provisional Patent Application No. 62/692,417, filed Jun. 29, 2018, entitled "PERCEPTION SYSTEMS FOR USE IN AUTONOMOUSLY CONTROLLING SYSTEMS." Each of these applications is hereby expressly incorporated by reference in its entirety.

BACKGROUND

Field

One technical field of the present disclosure is sensing systems, and more specifically, to perception systems for use in autonomously controlling systems.

Description of the Related Art

Autonomous systems require some sensing of their environment to provide information and feedback to the system. For example, many designs for autonomous vehicles use light imaging, detection, and ranging ("lidar") to measure their surroundings, identify neighboring objects, and determine the location and velocity of said objects. However, current lidar devices have a range of problems including low accuracy, high cost, slow speed, and high interference from external sources. Thus, improved lidar devices are desirable not only in the field of autonomous systems, but also in other fields of measurement.

SUMMARY

The techniques described herein provide comprehensive sensing solutions for autonomy applications, such as computer-assisted driving of automobiles, and other sensing applications. These techniques can be applied in numerous technologies and systems, including, but not limited to, personal and commercial ground transportation, avionics, robotics, industrial manufacturing, agriculture, mining, and mapping. The system may consist of a constellation, grouping, or collection of probes (including sensors or other input or sensing devices) to sense the environment and algorithms to interpret the data.

An example system is depicted in FIG. 1, in the context of a perception system for an automobile 1 with a central unit 10 and a plurality of probes 20 connected to the central unit 10. Each of the probes 20 can include one or more sensors. This system combines a set of features, including but not limited to the following:

Multimodality. Some or all of the sensors included in the constellation of sensors (sometimes called a super-sensor) contain multiple sensing modalities complementing and reinforcing each other, which may include, but are not limited to: lidar, radar, camera, gyroscope, kinematic and non-kinematic position sensors, kinematic and non-kinematic velocity sensors, global positioning systems (GPS), and ultrasonic sensors.

Concurrent. The different sensing modalities can be deeply integrated into a single super-sensor, both at the hardware and the software levels. In some embodiments, concurrent sensing by each of one or more super-sensors, using the techniques described herein, may replace multi-modality fusion (which may otherwise be required to combine or use simultaneously data obtained from multiple different sensors) to boost detection confidence (e.g., how confident the system is that it is detecting objects in an environment being sensed by the sensors) and measurement finesse.

Intelligent. In some embodiments, the sensors intelligently allocate their resources according to the scene. For example, areas of higher importance, such as those in the direction of travel, may be prioritized in allocation of resources. In some embodiments, pre-processing algorithms interpret the data and optimize the sensor's configuration on-the-fly.

Flexible. In some embodiments, probing and sensing are physically separated for better flexibility and reliability.

Centralized. In some embodiments, a subset of or the entire constellation of sensors operates as a single system. Signals from some or all the probes and the sensing modalities may converge into one single representation of the environment, which is then used to perceive objects in the environment.

Perceptive. In some embodiments, high level semantics accompany raw 3D maps for use in interpreting the environment. A dedicated computational engine may process the data through perception algorithms such as clustering, classification, and tracking.

Open. In some embodiments, the perception system can allow for multiple, different algorithms to run thereon, such as those discussed herein and elsewhere.

FIG. 2 depicts a block diagram of an example system. As shown, the central unit 10 can communicate with a probe 20 potentially having a variety of different sensors. The central unit 10 can include optics/electronics components that can receive optical or electronic signals from the probe 20 and provide initial processing of those signals. The optics/electronics components can also control the sensors, such as by providing instructions to measure in a particular way or in a particular area, or alternatively to provide necessary inputs such as a beam of light to optical sensors or power to electrical actuators. The central unit 10 can additionally include analog/digital converters to transform the signals from the sensors into digital form, and to transform digital instructions into analog inputs to drive various components at the probe 20. The analog/digital converters can communicate with a sensing engine, which can generate 3D maps and other representations of data received from the probes 20. The sensing engine can also generate digital instructions for the probes 20, which can then be converted to analog form by the converters. The central unit 10 can additionally include a perception engine that can provide a higher level analysis of the data provided by the probes 20. For example, the perception engine can use 3D maps and images generated by the sensing engine to identify other automobiles on a road, lane markings, pedestrians, and other features. These meaningful semantics can then be provided to other components, such as a separate route-planning system on an autonomous vehicle.

As noted above, the perception system can include a lidar sensor 100. A block diagram of a lidar subsystem, including a lidar sensor, is depicted in FIG. 3. As shown, the lidar sensor 100 can include a laser configured to output a beam of light. The laser can be, but is not limited to, a laser diode, quantum cascade laser, optical fiber laser, or distributed feedback laser. The laser can be connected or otherwise be in optical communication with optical fibers in the form of single-mode fibers, multimode fibers, tapered multimode fiber bundles, photonic crystal fibers, single mode fiber bundles, and photonic lantern multiplexers. Optical coupling in and out of the fiber can include a collimator in the case of a single fiber output, or a lenslet array in the case of fiber bundles or photonic lanterns. Further, a beam emitted from the lidar sensor 100 can be steered using electro-mechanical or electro-optical techniques. A rotatable mirror can optionally be used, having one or two axes of rotation and being controllable by a motor or other device. A rotatable polygonal mirror can also optionally be used for simultaneous 2-axis beam rastering. Using these fibers, fiber couplers (including dielectric mirrors, fiber coupler cubes, fiber-optic couplers, and metal-coated mirrors), waveguides, and/or other optical elements such as mirrors and lenses, the beam of light from a single laser can optionally be steered to the plurality of probes depicted in FIG. 1, and similarly the reflected beams resulting from that beam of light and reflected to those probes can optionally be routed back to the same central unit 10 for processing. Thus, as shown, the central unit 10 can include a plurality of transceivers that communicate with various probes 20. Even further, multiple probes 20 can optionally be connected to a single transceiver, allowing for probe multiplexing signals collected simultaneously from different moments in time, different directions in space, and also from multiple probes.

A variety of different lidar systems can be used with the above-described systems. For example, a lidar sensor can include an optical sensor, a laser, at least one phase modulator, and a processor. The optical sensor can be configured to produce a signal based at least on receiving one or more beams of light. A laser can be configured to emit an initial beam of light, a first portion of that light being directed into the environment, and an internal portion being directed to the optical sensor. The optical sensor can be configured to receive both the internal portion and a first reflected beam of light resulting from the first portion of the initial beam of light being reflected at a first point of reflection in the environment. The phase modulator can be configured to modulate a phase of the first portion of the first portion of the initial beam of light over a period of time with a unique code to embed the unique code into a modulated phase of the first portion of the initial beam of light prior to it being directed into the environment. The processor can be configured to receive signals from the optical sensor and to identify the first reflected beam of light as having resulted from the first portion of the initial beam of light based at least on detecting the unique code. The processor can be further configured to determine a distance to the first point of reflection based at least on the first reflected beam of light and the internal portion of the initial beam of light.

In a further embodiment, a lidar sensor can include an optical sensor, a laser, and a processor. The optical sensor can be configured to produce a signal based at least on receiving one or more beams of light. The laser can be configured to emit an initial beam of light, with a first portion of the initial beam of light being directed into the environment in a first direction, a second portion of the initial beam of light being directed into the environment in a second direction different from the first direction, and an internal portion of the initial beam of light being directed to the optical sensor. The optical sensor can be configured to receive each of the internal portion of the initial beam of light, a first reflected beam of light resulting from the first portion of the initial beam of light being reflected at a first point of reflection in the environment, and a second reflected beam of light resulting from the second portion of the initial beam of light being reflected at a second point of reflection in the environment. The processor can be configured to receive signals from the optical sensor and to identify the first reflected beam of light as having resulted from the first portion of the initial beam of light and the second reflected beam as having resulted from the second portion of the initial beam of light. The processor can further be configured to determine distances to the first and second points of reflection based at least on the first and second reflected beams of light and the internal portion of the initial beam of light. The time between direction of the first portion of the initial beam of light into the environment and reception of the first reflected beam of light by the optical sensor overlaps with the time between direction of the second portion of the initial beam of light into the environment and reception of the second reflected beam of light by the same optical sensor.

In a further embodiment, a lidar sensor can include an optical sensor, a laser, and a processor. The optical sensor can be configured to produce signals based at least on receiving one or more beams of light. The laser can be configured to emit an initial beam of light, a first portion of the initial beam of light being directed into the environment and an internal portion of the initial beam of light being directed to the optical sensor. The optical sensor can be configured to receive both the internal portion of the initial beam of light and a first reflected beam of light resulting from the first portion of the initial beam of light being reflected at a first point of reflection in the environment. The processor can be configured to receive signals from the optical sensor and identify the first reflected beam of light as having resulted from the first portion of the initial beam of light based on the signals. The processor can also be configured to determine a distance to the point of reflection based at least on the first reflected beam of light and the internal portion of the initial beam of light. Even further, the processor can be configured to determine a radial velocity of the point of reflection relative to the lidar sensor based at least on a time derivative of a difference in phases of the light field between the first reflected beam of light and the internal portion of the initial beam of light. Even further, the lidar sensor can be configured to determine an angular velocity of the point of reflection relative to the lidar sensor based at least on a Doppler shift of the first reflected beam of light and the determined radial velocity.

In a further embodiment, a lidar sensor can include a laser, a first fiber coupler, an optical synthesizer circuit, a transmitter, a receiver, a second fiber coupler, and an optical sensor. The laser can be configured to emit an initial beam of light, and the first fiber coupler can be in optical communication with the laser to receive and divide the initial beam of light into a transmitted portion and an internal portion. The optical synthesizer circuit can be in optical communication with the first fiber coupler to receive the transmitted portion of the initial beam of light from the first fiber coupler and to adjust the phase of the transmitted portion of the initial beam of light. The transmitter can be in optical communication with the optical synthesizer circuit to receive the transmitted portion with an adjusted phase from the optical synthesizer circuit and direct the transmitted portion into the environment. The receiver can be configured to receive the reflected beam of light from the environment resulting from the transmitted portion of the initial beam of light. The second fiber coupler can be in optical communication with the receiver and the first fiber coupler to combine the reflected beam of light and the internal portion of the initial beam of light into a combined beam of light. The optical sensor can be in optical communication with the second fiber coupler to receive the second beam of light.

In a further embodiment, a method of measuring distance can be provided. A beam of light can be split into a transmitted portion and an internal portion. The phase of the transmitted portion can be modulated over a period of time to embed a unique time-dependent code into the transmitted portion. The transmitted portion with the modulated phase can then be directed into the environment, and a reflected beam resulting from the transmitted portion being directed into the environment can be received. The reflected beam can be identified as resulting from the transmitted portion being directed into the environment at least by detecting the unique code. A distance to a point of reflection can then be estimated using the reflected beam and the internal portion.

In a further embodiment, a method of simultaneously measuring multiple distances can be provided. A beam of light can be split into a first transmitted portion, a second transmitted portion, and an internal portion. The first and second transmitted portions can be directed into the environment in different directions. Reflected beams resulting from the first and second transmitted portions being directed into the environment can then be received at a single optical sensor. The reflected beams can be identified as resulting from the first and second transmitted portions being directed into the environment, and a distance to the points of reflection can be estimated using the reflected beams and the internal portion. The time between the directing of the first transmitted portion into the environment and receiving the reflected beam resulting from the first transmitted portion can overlap with the time between the directing of the second transmitted portion into the environment and receiving the reflected beam resulting from the second transmitted portion.

In a further embodiment, a method of operating a lidar sensor to measure a distance to an object and a velocity of the object can be provided. A beam of light can be split into a transmitted portion and an internal portion, and the transmitted portion can be directed into the environment. A reflected beam resulting from the transmitted portion being directed into the environment can be received. A distance to a point of reflection can be estimated using the reflected beam and the internal portion. Additionally, a radial velocity of the point of reflection relative to the lidar sensor can be estimated, based at least on a time derivative of a difference in phases of the light field between the reflected beam of light and the internal portion. Further, an angular velocity of the point of reflection relative to the lidar sensor can be estimated based at least on a Doppler shift of the reflected beam and the determined radial velocity.

In a further embodiment, a lidar sensor comprises a light source configured to generate a source light having different wavelengths. The lidar sensor additionally comprises an optical synthesizer circuit configured to receive a portion of the source light, where the portion comprises light beams having different wavelengths. The optical synthesizer circuit comprises a phase modulator configured to embed a unique code into at least one of the light beams. The lidar sensor further comprises a plurality of transceivers configured to receive from the optical synthesizer circuit at least one of code-embedded light beams having different wavelengths, to direct the at least one of the code-embedded light beams into an environment, and to receive at least one of reflected light beams from objects reflecting the at least one of the code-embedded light beams. The lidar sensor is configured to detect distances between the objects and the transceivers using the at least one of the reflected light beams.

In a further embodiment, a lidar sensor comprises a light source configured to generate a source light comprising a plurality of light beams having different wavelengths. The lidar sensor additionally comprises a plurality of optical synthesizer circuits, where each of the optical synthesizer circuits is configured to receive a portion of one of the light beams having one of the wavelengths. Each of the optical synthesizer circuits comprises a phase modulator configured to embed a unique code into the portion of the one of the light beams. The lidar sensor further comprises a plurality of transceivers each configured to receive from a respective one of the optical synthesizer circuits one of code-embedded light beams, to direct the one of the code-embedded light beams into an environment, and to receive a reflected light beam from an object reflecting the one of the code-embedded light beams. The lidar sensor is configured to detect a distance between each of the transceivers and the object using the reflected light beam.

In a further embodiment, a lidar sensor comprises a light source configured to generate a source light comprising a plurality of light beams having different wavelengths. The lidar sensor additionally comprises one or more optical synthesizer circuits, wherein each of the optical synthesizer circuits is configured to receive a portion of the source light and to divide the portion of the source light into a first part and a second part, and wherein the each of the optical synthesizer circuits comprises an optical component configured to embed a unique code into at least the first part. The lidar sensor further comprises a plurality of transceivers each configured to receive from a respective one of the optical synthesizer circuits one of code-embedded light beams, to direct the one of the code-embedded light beams into an environment, and to receive a reflected light beam from an object reflecting the one of the code-embedded light beams. The lidar sensor is configured to detect a distance between each of the transceivers and the object using the reflected light beam.

BRIEF DESCRIPTION OF THE DRAWINGS

Further objects, features and advantages of the invention will become apparent from the following detailed description taken in conjunction with the accompanying figures showing illustrative embodiments of the invention, in which.

DETAILED DESCRIPTION

Figure 4A:
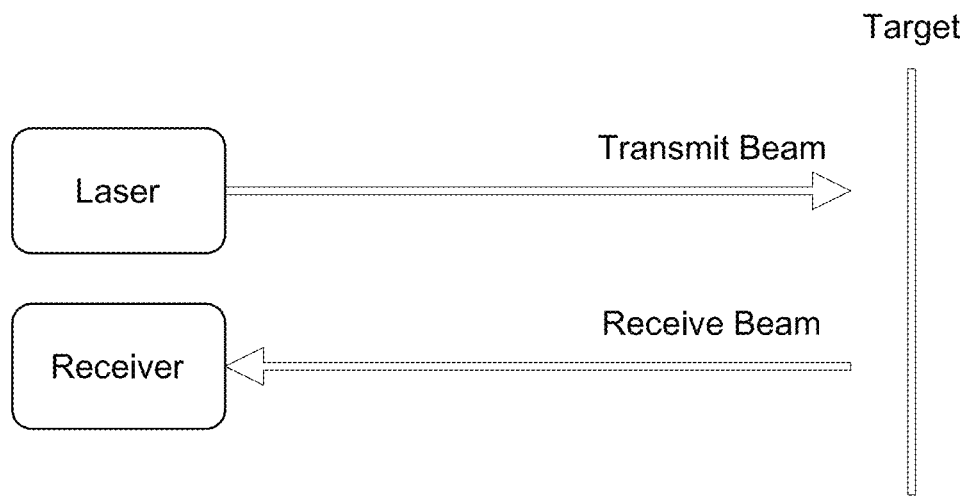
FIG. 4A depicts a lidar system using direct detection.
Figure 4B:
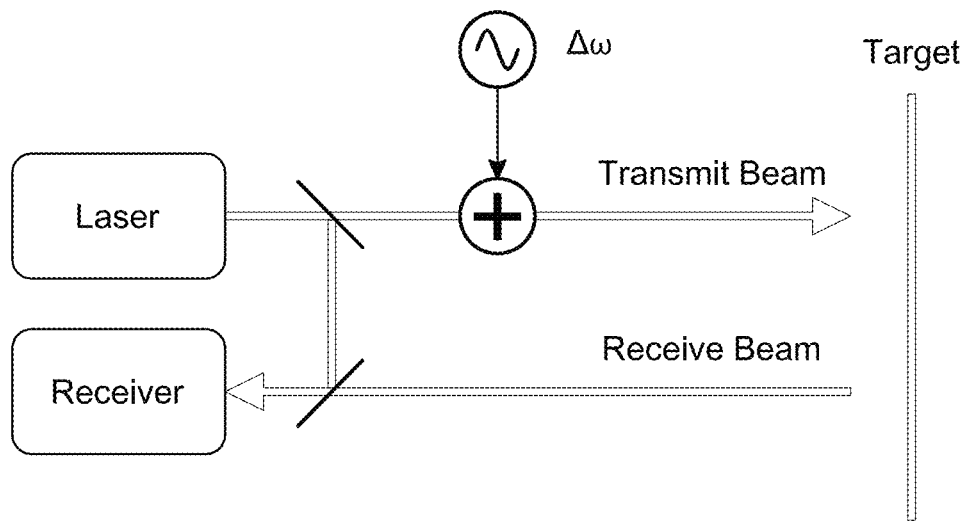
FIG. 4B depicts a lidar system using coherent detection.

FIGS. 4A and 4B depict lidar systems using direct detection and coherent detection. Lidars detect objects by actively illuminating the environment and measuring the intensity of the light reflected by any encountered surfaces. Sensing techniques fall into two main camps: direct and coherent (sometimes called "indirect"). Direct detection techniques (depicted in FIG. 4A) may measure the intensity of the reflected light directly with an optical sensor (such as a photodiode, photoreceiver, or photodetector). Coherent detection techniques (depicted in FIG. 4B) may use an indirect method: mixing together the received light with part of the transmitted light on the optical sensor and measuring the interference between them with the optical sensor.

In some embodiments, coherent detection provides the following advantages over direct detection:

Noiseless signal amplification. Direct and coherent detection often respond to background and electronic noise in very different ways. In direct detection, amplifying the signal often also amplifies the noise, without improving the signal-to-noise ratio (SNR). In contrast, coherent detection is often capable of amplifying the signal alone and improving the SNR.

Dynamic range. Direct and coherent detection differ also by their dynamic range. In direct detection the signal is often directly proportional to the intensity of the received light and falls with the inverse of the squared distance of the object. In coherent detection the signal is often directly proportional to the amplitude of the received intensity and falls with only the inverse of the object's distance.

Unlike some coherent detection technologies based on frequency modulation, some lidar systems described herein detect the range of objects by measuring the phase of the reflected light. They can potentially do so by solving one or more key problems that rendered coherent detection methods not applicable before: 1) the intrinsic ambiguity in mapping the phase of the light into distance; 2) the instability of the phase of the light upon reflection from a rough surface; 3) the Doppler shift in the frequency of the light reflected by moving objects; 4) the narrow acceptance angle of the receiver; 5) the intrinsic indistinguishability of signals coming from different directions; 6) the laser's phase fluctuations due to noise.

(1) Phase ambiguity. The relative phase $\Delta \phi$ between the transmitted and the received waves (having a wavelength $\lambda$) is directly proportional to the round trip distance to the object 2L:

$$\Delta\phi = \frac{4\pi}{\lambda} L$$

In principle L could be obtained by measuring $\Delta \phi$ and inverting this relationship. However, the phase increases by 360° degrees when the light travels through a distance equal to its wavelength (for example, approximately one micrometer). After that it wraps back to zero such that:

$$\Delta\phi = \frac{4\pi}{\lambda}(L \bmod \lambda)$$

The phase of the light has effectively only "short-term memory" of the distance traveled and by itself it could not be used to measure distances longer than the light's wavelength.

(2) Phase instability. The phase of the light reflected by rough surfaces changes abruptly if the object moves under the illuminating light even slightly. That makes the phase measurement not practical in many situations.

(3) Doppler uncertainty. The velocity (v) of an object makes the frequency (f) of the reflected light increase or decrease depending on whether it's leaving or approaching the receiver:

$$f_{Doppler} = \frac{v}{\lambda}$$

Because the frequency shift is unknown and can suddenly change as the lidar looks at different points in space, finding the signal and tracking its phase is challenging.

(4) Slow scanning. For the interference between the transmitted and the received light to generate a large signal, the two waves need to overlap sufficiently well on the optical sensor. In some coherent systems, this requirement may significantly limit the effective field of view of the receiver and consequently the beam scanning speed.

(5) Directional ambiguity. Some coherent lidars are not capable of distinguishing signals entering the optical sensor simultaneously from multiple directions. For the same reason, other lidars in the field of view can generate interference.

(6) Laser phase noise. In interferometric ranging the phase of the transmitted light is effectively the length used as a reference to measure other distances. The intrinsic instability of the laser frequency/phase or mechanical vibrations propagating through the transmitter can significantly affect the raining accuracy/precision.

There are numerous possible approaches to and/or architectures for lidar systems that can address some or all of these problems. FIGS. 5A-5H depict lidar sensor systems that use superheterodyne coherent detection methods measuring the phase of an RF beatnote (although frequency ranges outside RF are also possible). In some embodiments, the techniques measure the phase between two coincident and spatially/temporally coherent laser beams. Factors like phase ambiguity, phase instability and Doppler uncertainty may affect both beams to the same extent and cancel out in a differential measurement. To do so, the beams need to be separable yet be precisely overlapped. This is discussed in more detail herein.

Figure 3:
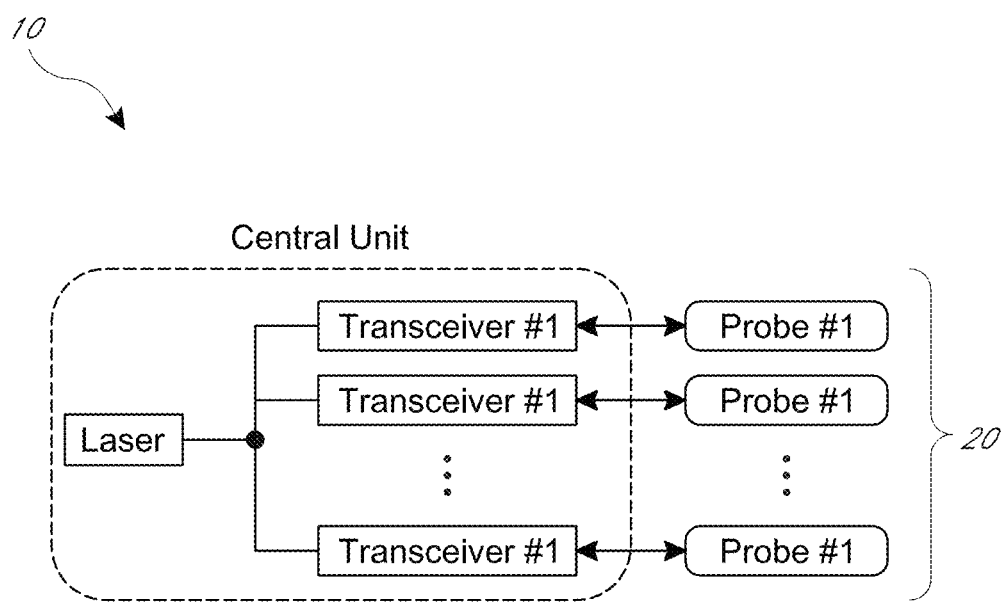
FIG. 3 is a block diagram of an embodiment lidar system.
Figure 5A:
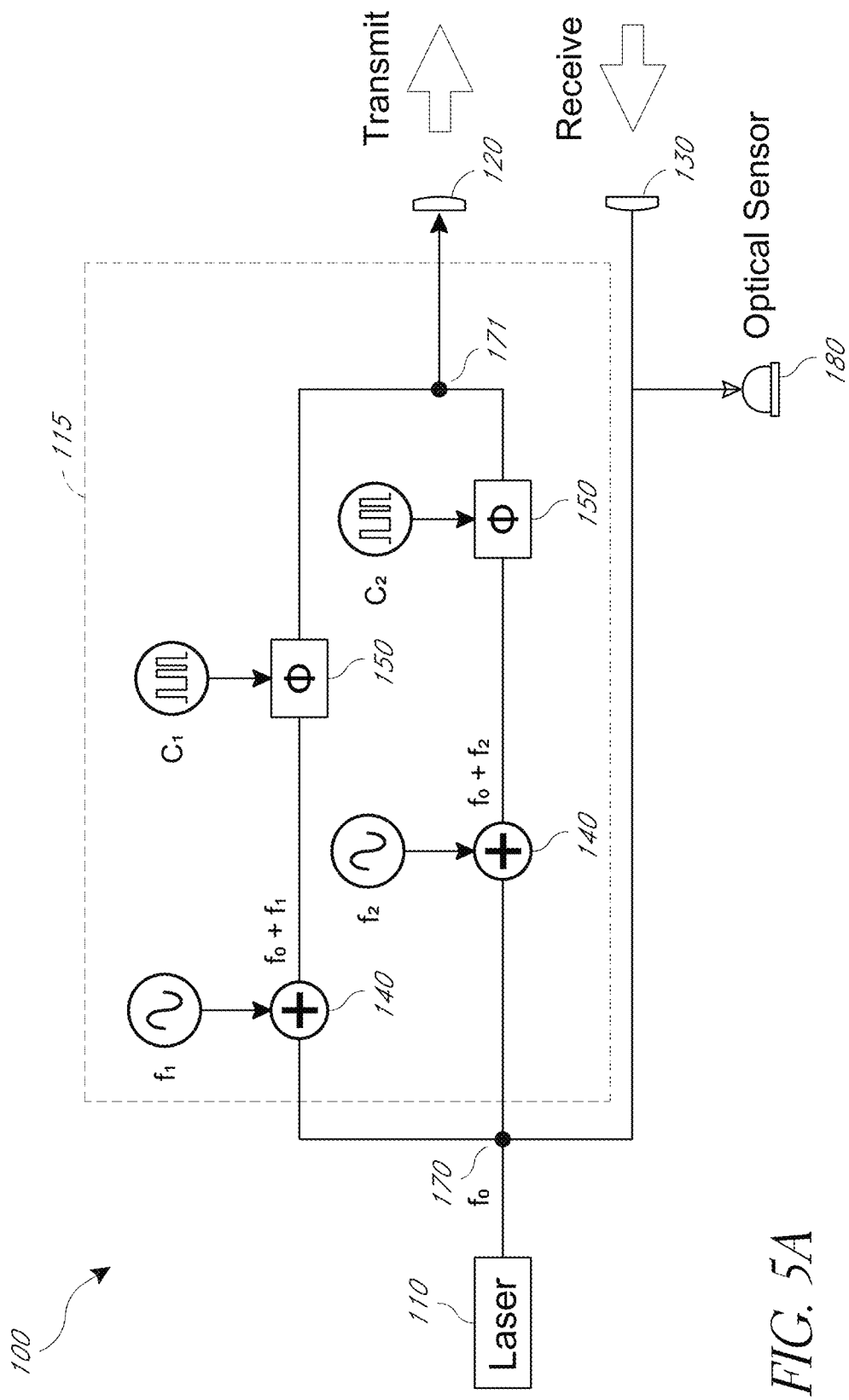
FIGS. 5A-5H depict various lidar systems using coherent detection and superheterodyne techniques.

FIG. 5A depicts a lidar sensor 100A including a laser 110. The laser 110 can optionally be part of a central unit 10, as described above. As further discussed above, the laser 110 can be separate from the other components depicted in FIG. 5A. Even further, the laser 110 can optionally be shared between multiple lidar sensors, such that one laser 110 can potentially provide beams of light simultaneously to a plurality of lidar sensor arrangements as shown in FIG. 3 (where the remaining components in FIG. 5A can be provided separately to each transceiver). One or more fiber couplers can be used to propagate the beam of light from a single laser to multiple subsystems. However, in other embodiments each lidar sensor 100 can include a dedicated laser 110, as implied by the arrangement of components depicted in FIG. 5A.

The initial beam of light from the laser 110 in FIG. 5A can be split (for example, with one or more fiber couplers 170) into three separate portions. A first portion of the beam can be directed (for example with an optical fiber) to a first frequency shifter 140. The first frequency shifter 140 can be, for example, an electro-optical frequency shifter based on the Pockels effect or an acousto-optic frequency shifter. As shown, the first frequency shifter 140 can adjust or modulate the frequency of the first portion of the beam from a frequency $f_0$ to another frequency $f_0+f_1$. Although the frequency is depicted as being adjusted higher, in other embodiments the frequency can be adjusted lower. More generally, the frequency can be adjusted to be a variety of different frequencies, optionally between zero and 10 GHz.

Figure 7A:
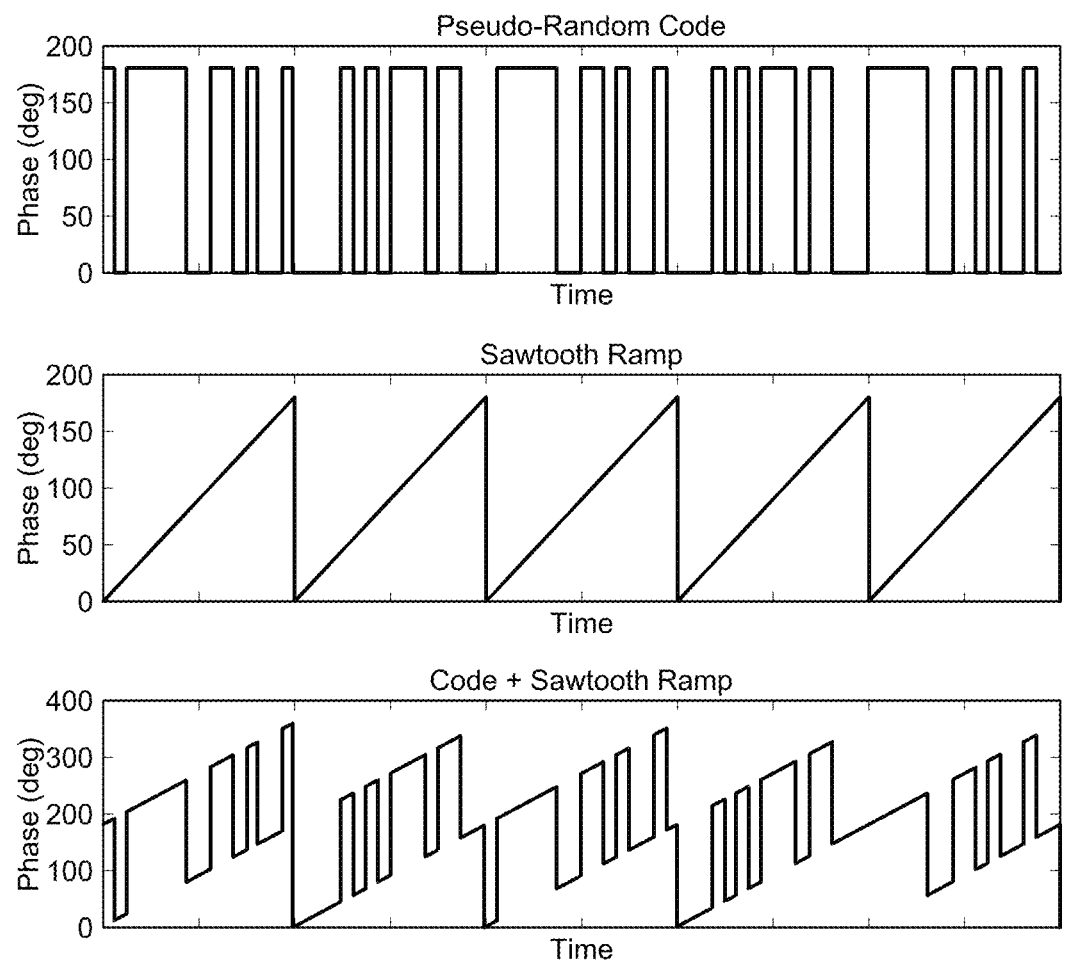
FIGS. 7A and 7B depict codes that can be embedded into a phase of a beam of light.

The first portion can then be directed to a first phase modulator 150. The first phase modulator 150 can be, but not limited to, a lithium niobate crystal or waveguide. The first phase modulator 150 can be configured to embed a code $c_1$ in the phase of the first beam of light over a period of time. As shown, the code can be substantially binary or quaternary, like a bar code. For example, the code can shift between a zero degree phase for a period of time and then to a 180 degree phase for a period of time, repeating that pattern for varying durations to generate the code. Even further, the code can optionally be random or pseudo-random and have a sufficient length to be considered unique. An example code is depicted in FIG. 7A. However, other variations are possible. For example, the phase can optionally shift 90 degrees, 45 degrees, or 30 degrees. Further, the phase can be non-binary, including more than two possible phases.

A second portion of the beam of light from the laser 110 can be manipulated in a similar manner as the first portion, as depicted in FIG. 5A. As shown, the second portion can be directed on an optical path different from the first portion, and can be adjusted by a second frequency shifter 141, adjusting the second portion to a frequency $f_0+f_2$ that can be optionally different from the first frequency, and a second phase modulator 151 that can be optionally configured to provide a similar but different code $c_2$ to the second portion such that the two codes are substantially orthogonal to each other. The first portion and the second portion can then be combined by a fiber coupler 171 and then jointly directed to a transmitter 120. In this manner, a combined beam can be generated having a frequency $f_1-f_2$ and a phase-modulated code $c_1c_2$ (a separate component having a frequency $f_1+f_2$ can be ignored for these purposes). In some embodiments the frequency $f_1-f_2$ can be between 0 to 10 GHz. This combined beam is generated by an optical synthesizer circuit 115, which can adjust the frequency and phase of portions of light prior to transmission into the environment. The optical synthesizer circuit 115 can optionally include components in addition to the frequency shifters 140, 141 and phase modulators 150, 151 such as collimators, mirrors, lenses, fiber couplers, delay lines, and other optical components that can prepare the beam for transmission. Further, although the first fiber coupler 170 is not depicted as being part of the optical synthesizer circuit 115 in FIG. 5A, it can optionally be considered to be part of the optical synthesizer circuit 115. For example, in another example of a lidar sensor in FIG. 5B, the function of the fiber coupler 170A in FIG. 5A is split into two fiber couplers 170B and 171B, only one of which being part of the optical synthesizer circuit 115.

The combined beam can then be directed into an environment by the transmitter 120. The transmitter 120 can optionally include various optical components such as one or more lenses, mirrors, collimators, or other devices. Further, the transmitter 120 can also optionally include adjustable components such that the first and second portions of the beam of light can be directed in a controllable direction. For example, the transmitter 120 can optionally have an angular range of at least 180 degrees, 90 degrees, or 45 degrees.

Figure 2:
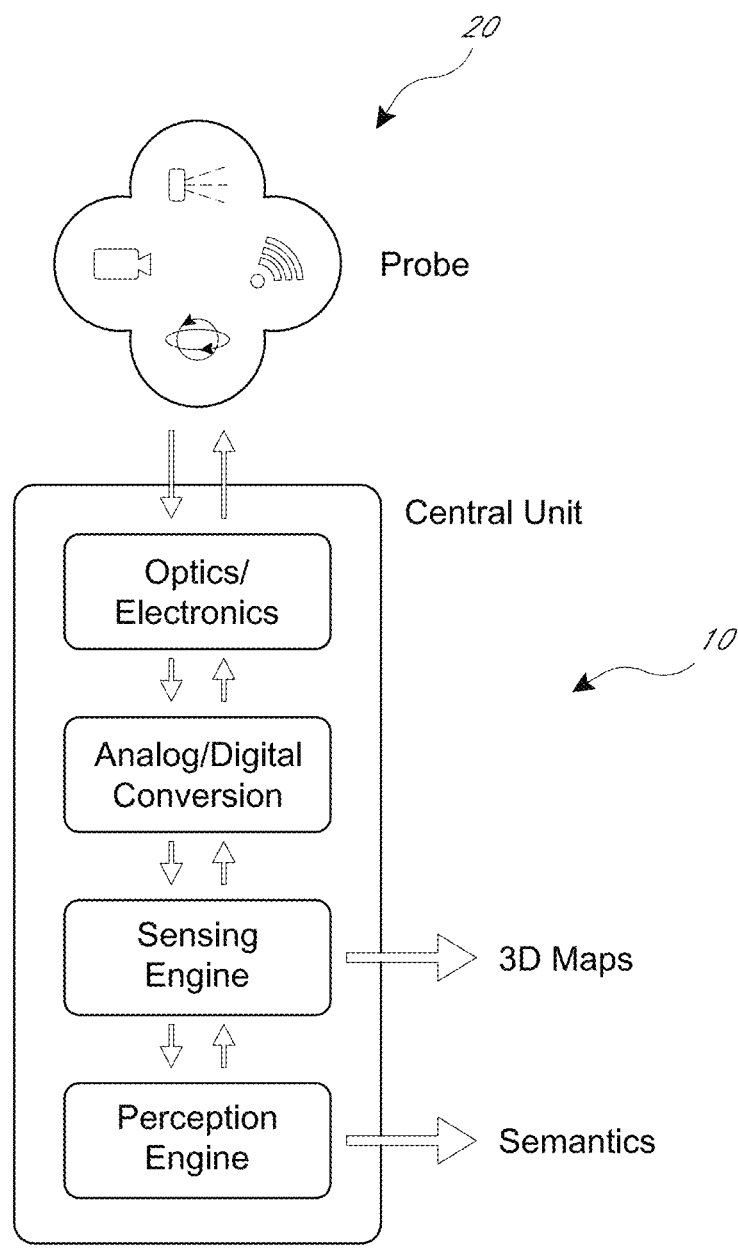
FIG. 2 is a block diagram of an embodiment perception system.

The combined beam directed into the environment can encounter an object causing a reflected beam that results from the first and second portions. This reflected beam can then be received by a receiver 130 and can be directed to an optical sensor 180. The optical sensor can also receive an internal portion of the initial beam of light from the laser 110. Thus, the optical sensor 180 can potentially derive information from the characteristics of the reflected beam and the characteristics of an interference between the reflected beam and the internal portion of the initial beam. The optical sensor 180 can then generate a signal indicative of the beams received and can provide that signal to a computer system 300 (depicted in FIG. 8), and potentially through the system depicted in FIG. 2, for further analysis. Such analysis can include steps such as identifying the codes $c_1$ and $c_2$ in the reflected beams to identify the time of transmission of said beams. A representation of the combined beam without the codes can also be synthesized electronically (digitally or in analog) by measuring and subtracting the phase of beatnotes of each of the reflected beams with the local oscillator, after appropriate decodings (such as removing the codes $c_1$ and $c_2$). The combined beam can also be synthesized by squaring the signal at the optical sensor 180, canceling out possible Doppler shifts induced by a moving object at the point of reflection. Further, comparing the phase of the received reflected beam to the beam that was transmitted can be used to determine (and then cancel) noise caused by instability in the laser 180, mechanical vibrations, and other effects.

Further variations on this system are also possible. For example, in some embodiments the transmitter 120 and receiver 130 can be combined into a transceiver with shared lenses, mirrors, or other components. Additionally, like the laser 110, the optical sensor 180 can also be part of the central unit 10, separate from the other components depicted in FIG. 5A such as the optical synthesizer circuit 115, or be shared between multiple lidar sensors. Even further, parts of the optical synthesizer circuit 115 can be shared between multiple lidar sensors, such as by using a single frequency shifter 140/141 to generate a portion with a shifted frequency that can be used for multiple lidar sensors.

The use of the codes $c_1$ and $c_2$ can facilitate the identification of the combined beam among a variety of other combined beams (having different codes) that can be collected at a single optical sensor 180 shared amongst a plurality of lidar sensors 100A. Thus, for example, a lidar sensor could have two sets of components (such as two optical synthesizer circuits 115, frequency shifters 140, phase modulators 150, transmitters 120, and/or receivers 130) each using directing separate combined beams (which can be portions of the same initial beam from the laser 110) to measure distances in different directions simultaneously (such that the times of transmission into the environment and reception of a reflected beam for each set of components can overlap). It should also be noted that the codes can also facilitate the identification of reflected beams originating from the lidar sensors 100 as opposed to beams that might be emitted by other devices such as neighboring cars that might also include lidar sensors, such that the lidar sensors 100 can operate in the presence of large numbers of other lidar sensors.

The reflected beam can be used to measure a variety of features relating to an object at the point of reflection. For example, the reflected beam can indicate a distance L to the point of reflection using the phase of the received synthetic beam $\Phi_r$ relative to that of the transmitted synthetic beam $\Phi_t$ (along with the wavelength $\Lambda$ of the synthetic beam):

$$L = \frac{\Lambda}{4\pi}(\Phi_t - \Phi_r)$$

The phase of the transmitted synthetic beam $\Phi_r$ can be estimated by measuring a phase of the beam prior to being directed into the environment. For example, the transmitter 120 can create a reflection that can also be received by the optical sensor 180 for measurement. Alternatively, a portion of the beam can be measured further upstream, prior to reaching the transmitter 120.

This analysis optionally can be done after an electronic representation of the beam without the codes has been generated. The ambiguity range (due to the repeating of the phase) can be made arbitrarily large by choosing close enough frequency shifts $f_1$ and $f_2$, leading to a synthetic wavelength (using the speed of light c):

$$\Lambda = \frac{c}{f_1 - f_2}$$

For example, the wavelength can be greater than 300 m for $f_1-f_2$ less than 1 MHz. However, in some situations the frequency shift cannot easily be made small enough to yield a sufficiently large wavelength. Nevertheless, the resulting ambiguity from phase differences can be resolved by measuring the delay of the propagated code from transmission to reception, which can indicate a time-of-flight of the beam and thus a distance when compared with the speed of light. This code delay can provide a coarse measurement of the range, and the phase difference can provide a fine measurement of the last fraction of the distance. Combined, the coarse and the fine measurement can provide an accurate and unambiguous measurement of the distance. For example, the lidar sensor 100 can have an accuracy of 1 mm or better. Further, the lidar sensor 100 can measure to this accuracy at ranges of 10 meters, 50 meters, 100 meters, 200 meters, or 500 meters.

The reflected beam can also be used to measure a velocity of the point of reflection (for example, a velocity of an object when the point is on the object). The velocity of the point in a radial direction from the lidar sensor 100 can be determined by using a time derivative of the distance:

$$v_\parallel = \frac{\Lambda}{4\pi}\frac{d}{dt}(\Phi_t - \Phi_r)$$

This measurement can be facilitated using the code embedded in the beam, which allows continuous measurement, unlike other techniques that rely on discreet pulses.

The velocity of the point in an angular direction, tangential to the lidar sensor 100 can also be determined. For example, a Doppler frequency shift can be measured from the reflected beam, indicating a total velocity when multiplied by the wavelength $\lambda$. The radial velocity can then be subtracted to determine the angular velocity:

$$v_\perp = \lambda f_{Doppler} - v_\parallel$$

The reflected beam can also be used to measure a reflectivity of the object at the point of reflection. The amplitude of the reflected beam can indicate a reflectivity of the object when compared with experimental results at comparable distances, using look-up tables for example.

Figure 5B:
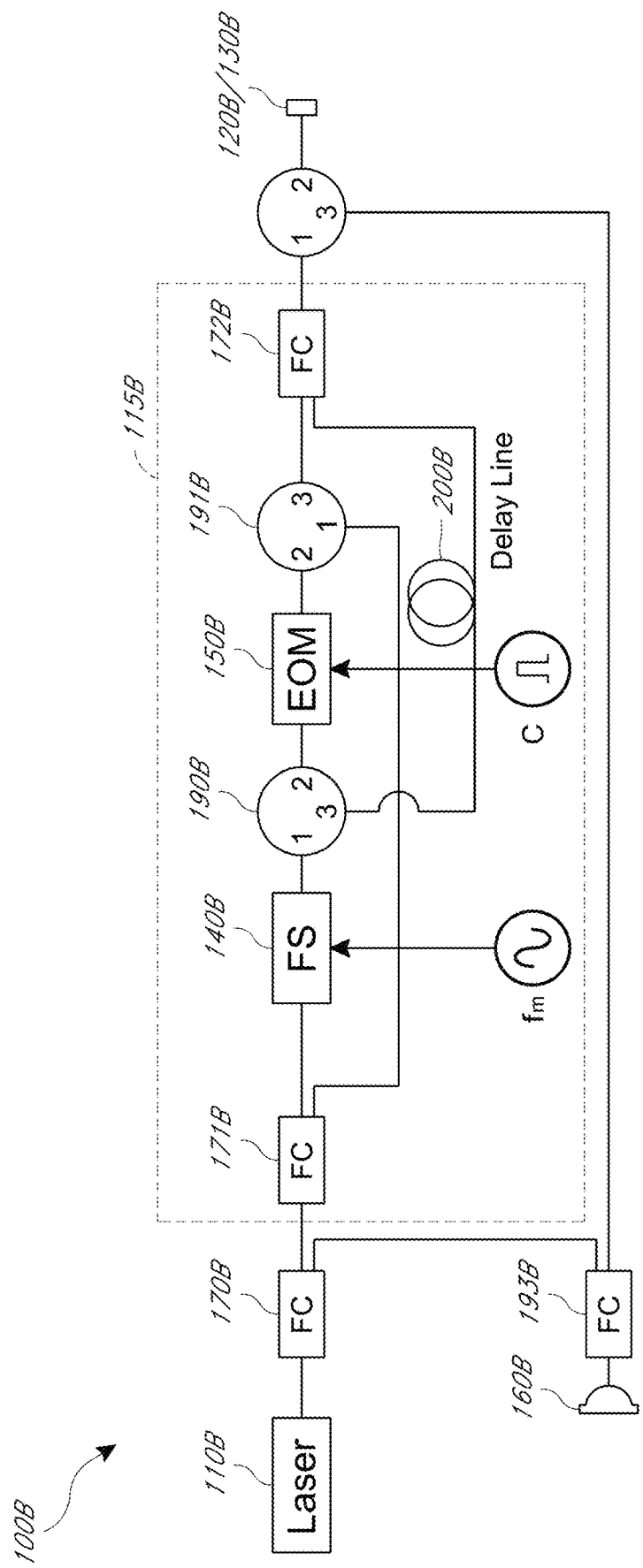

Further variations on the design of the lidar sensor 100 are also possible, as shown by example in FIGS. 5B-5H, which can be similar to the embodiment in FIG. 5A unless indicated to the contrary, with similar names and reference numbers indicating similar components. For example, as shown in FIG. 5B, the lidar sensor 100B can include only one frequency shifter 140B (for instance an acousto-optic modulator, "AOM", although other frequency shifters are also possible) and one phase modulator (depicted as an electro-optic modulator, "EOM", although other phase modulators are also possible including, but not limited to dual-parallel Mach-Zehnder interferometers) 150B to adjust the frequency of a first portion of the initial beam of light and apply a code to each of the first and second portions of the initial beam of light emitted by the laser 110B. This initial beam of light can encounter a first fiber coupler 170B which can direct an internal portion of the beam toward an optical sensor 160B, and direct the remaining beam to an optical synthesizer circuit 115B. The optical synthesizer circuit 115B can include a second fiber coupler 171B, splitting first and second portions of the beam for transmission. The first portion can proceed directly to a frequency shifter 140B, then to a phase modulator 150B, and then to a transmitter 120B in substantially the same way as in FIG. 5A. Distinct from FIG. 5A, the embodiment in FIG. 5B can include a first optical circulator 190B between the frequency shifter 140B and the phase modulator 150B, a second optical circulator 191B between the phase modulator and a third fiber coupler 172B, and a third optical circulator 192B between the third fiber coupler 172B and the transmitter 120B. However, the second portion can be directed from the second fiber coupler 171B to the second optical circulator 191B, such that it can then pass through the phase modulator 150B in reverse relative to the first portion. The second portion can be directed by the first optical circulator 190B to an optional delay line 200B and then to the third fiber coupler 172B

(where it can be combined with the first portion, the coupler serving as a combiner) to be transmitted with the first beam portion as in FIG. 5A.

The code provided by the phase modulator 150B can be unique, such as with a pseudo-random code as described above (although different types of codes from spread spectrum theory can be used). This code can be sufficiently random such that a delay provided by the delay line 200B can shift the codes applied to the first and second portions of the beam of light sufficiently for the two codes to be substantially orthogonal to each other. Thus, the processing of signals from the lidar sensor 100B can be substantially the same as from the lidar sensor 100 of FIG. 5A, with the exception that $f_2$ is zero. Nevertheless, $f_1$ can optionally be adjusted in a similar manner to achieve the desired ambiguity range for the measured distance as discussed above with respect to FIG. 5A.

FIG. 5B also depicts an embodiment where the transmitter 120B and the receiver 130B are combined into a single transceiver, with the third optical circulator 192B directing the reflected beam from the transceiver 120B/130B to a fourth fiber coupler 193B. The fourth fiber coupler 193B combines the reflected beam and the internal portion of the initial beam, and directs them to the optical sensor 160B.

Figure 5C:
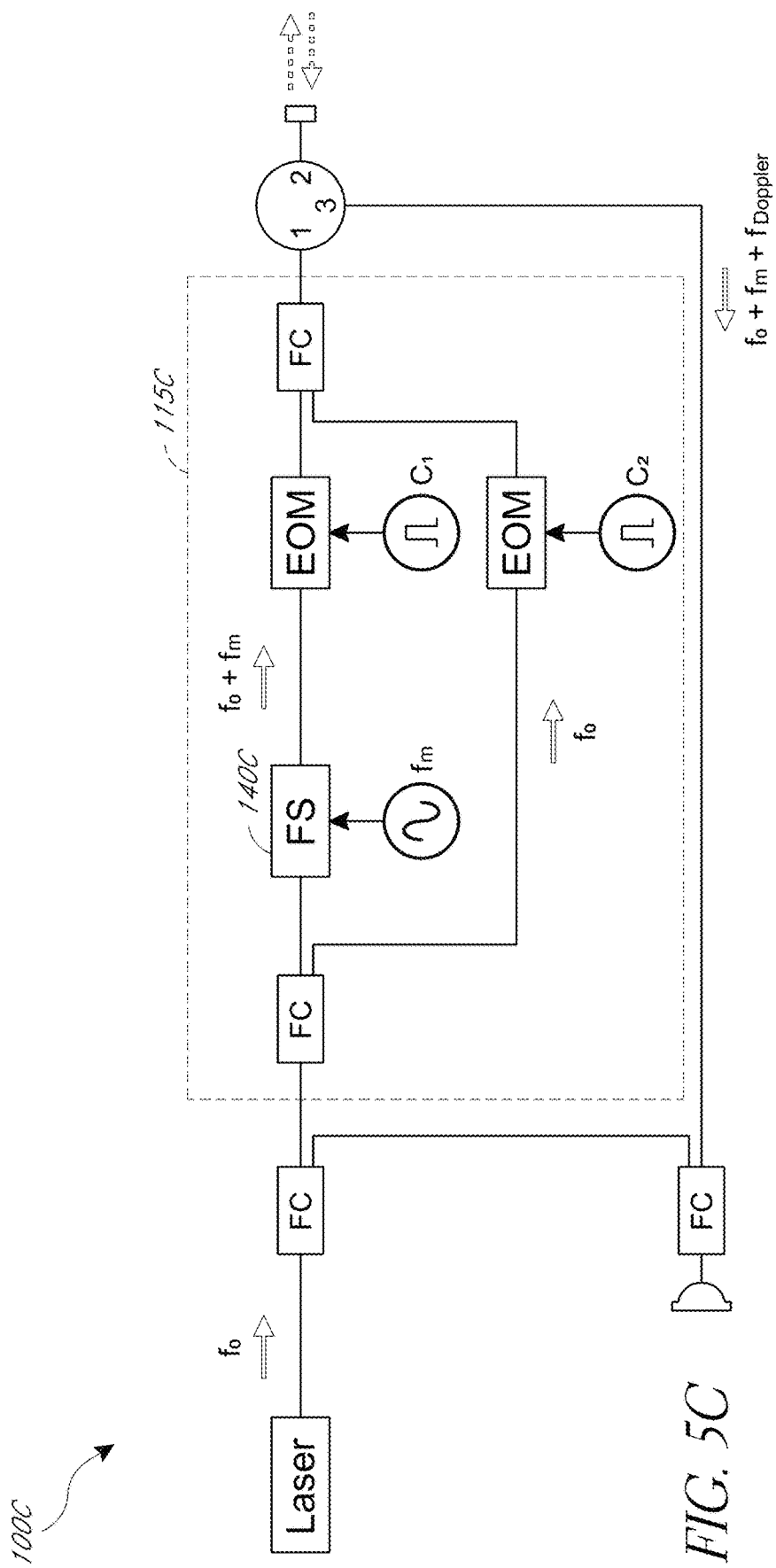

FIG. 5C depicts an embodiment lidar sensor 100C with similarities to both the lidar sensors 100A, 100B of FIGS. 5A and 5B. As shown, the optical synthesizer circuit 115C can include separate and independent paths for each of the first and second portions of the initial beam of light, as in FIG. 5A. However, only one frequency shifter 140C is included, such that only one of the two portions has its frequency shifted, as in FIG. 5B.

Figure 5D:
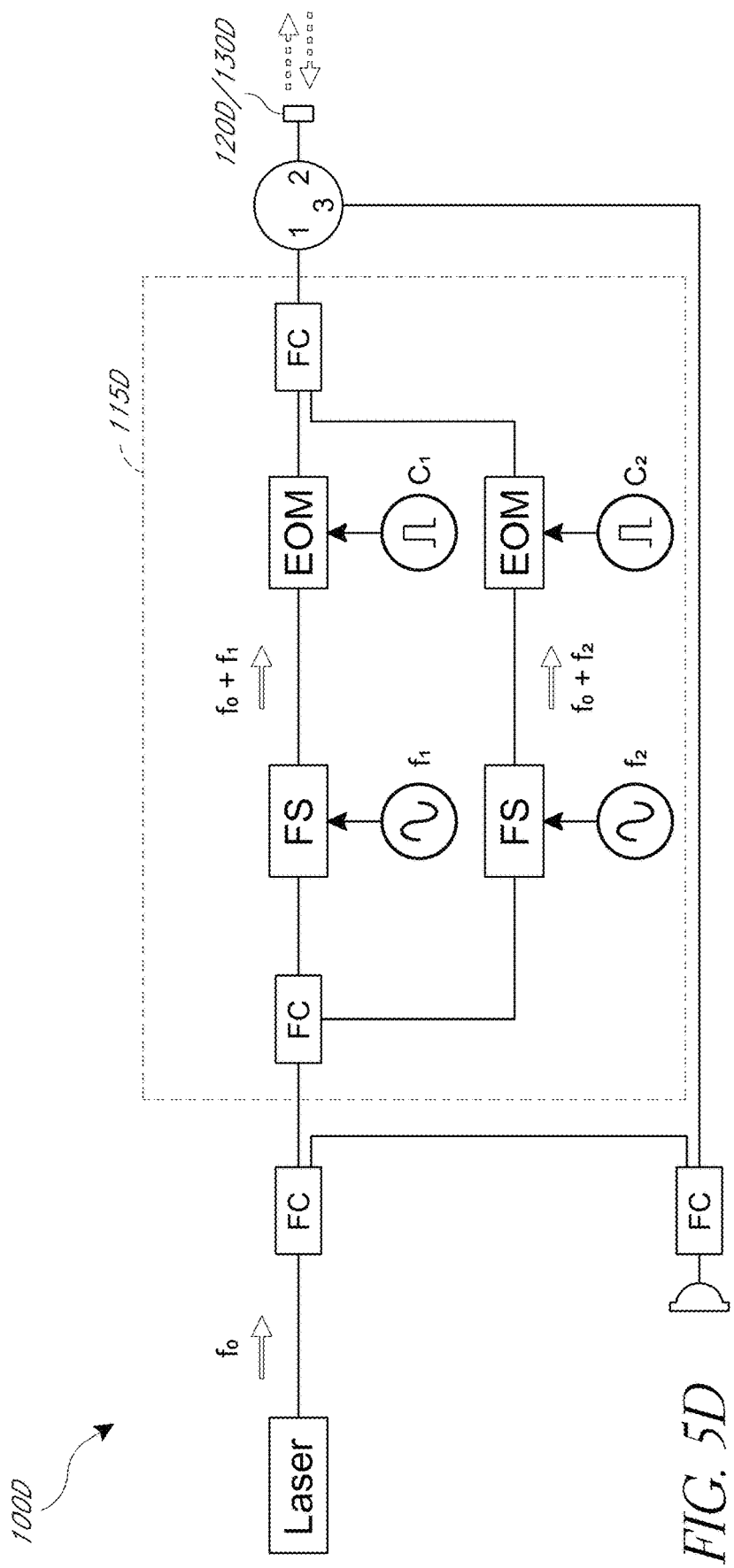

FIG. 5D depicts an embodiment lidar sensor 100D substantially similar to the lidar sensor 100A in FIG. 5A, with some minor differences. For example, a transceiver 120D/130D can replace the separate components in FIG. 5A.

Figure 5E:
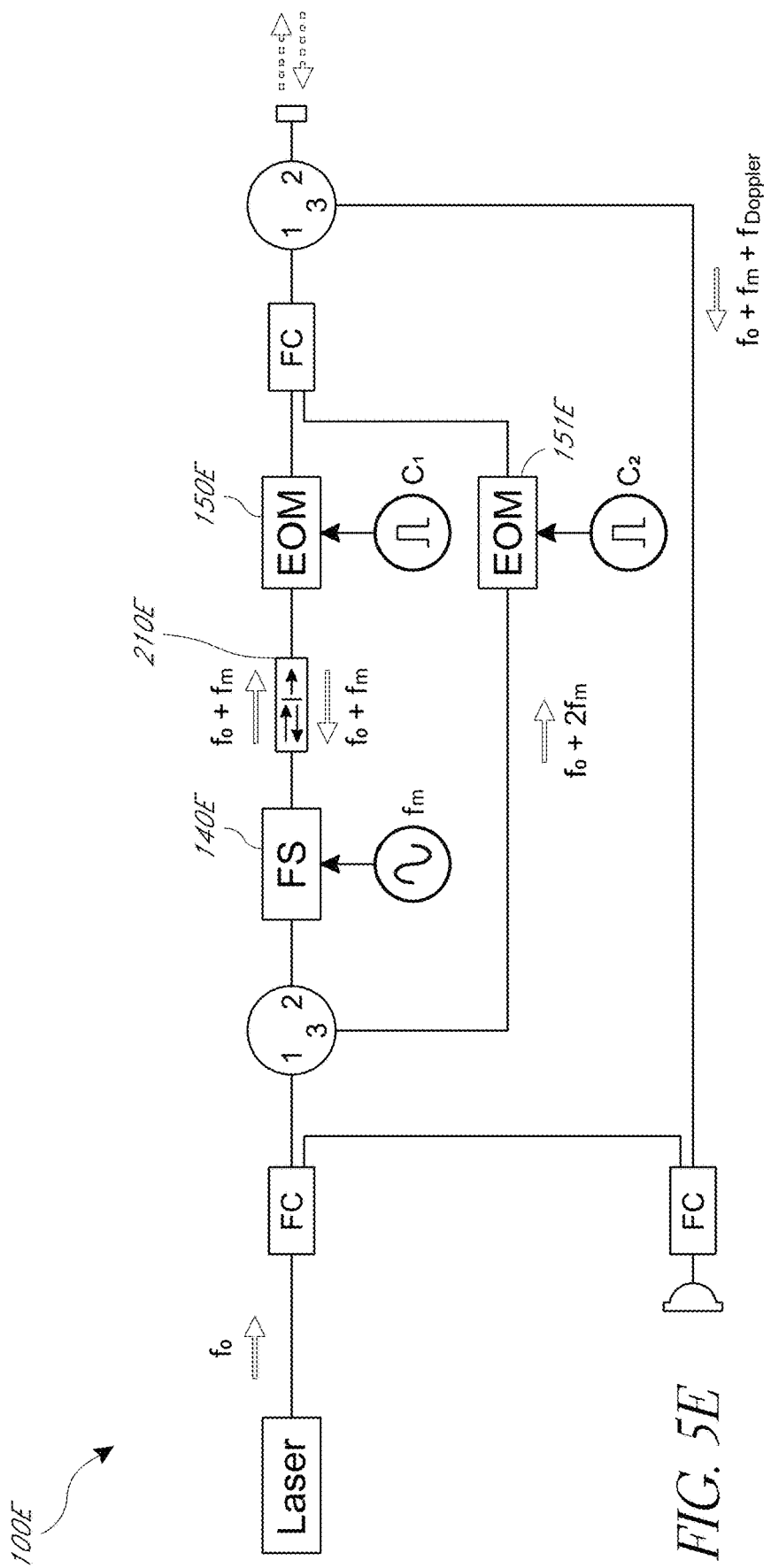

FIG. 5E depicts an embodiment lidar sensor 100E substantially similar to the lidar sensor 100D in FIG. 5D, but including only one frequency shifter 140E. As shown, the optical synthesizer circuit 115E can include a partially-reflective mirror 210E between the frequency shifter 140E and a first phase modulator 150E, such that a first portion of the initial beam can pass through these two components as in FIGS. 5A-5D. The second portion of the initial beam can be separated from the first portion here by the reflection at the in-line partial retroreflector 210E (which function as an in-line fiber coupler), instead of at a fiber-optic fiber coupler as depicted in the figures for the previous embodiments. The second portion can then pass through the frequency shifter 140E a second time, yielding a frequency $f_0+2f_m$ (with the first portion's frequency at $f_0+f_m$). The second portion can then be directed by the optical circulator 190E to a second phase modulator 151E to apply a code and pass the beam to a second fiber coupler 170E for recombination with the first portion prior to transmission.

Figure 5F:
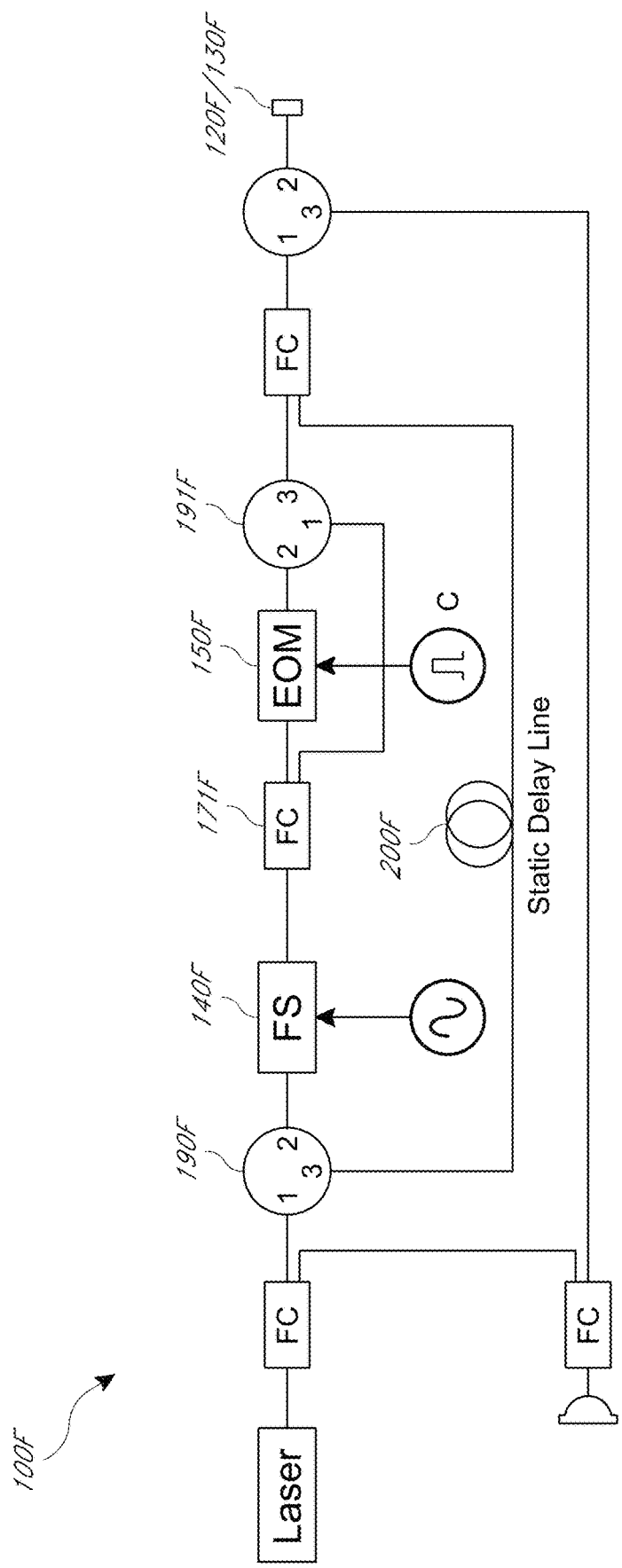

FIG. 5F depicts an embodiment lidar sensor 100F similar to the lidar sensor 100E in FIG. 5E, but using only a single phase modulator 150F and a different method for separating the first and second portions of the initial beam. As shown, instead of a partially-reflective mirror between the frequency shifter 140F and the phase modulator 150F, a second fiber coupler 171F can be included, and a second optical circulator 191F can be provided between the phase modulator 150F and a fiber coupler 172F prior to the transceiver 120F/130F. Thus, the second portion of the initial beam can be separated at the second fiber coupler 171F, which can direct the second portion past the phase modulator 150F to the second optical circulator 191F. The second portion can then be directed in a reverse direction through the phase modulator 150F and the frequency shifter 140F (yielding a frequency of $f_0+2f_m$ as in FIG. 5E). Finally, the first optical circulator 190F can direct the second portion through a delay line 200F prior to recombination with the first portion.

Figure 5G:
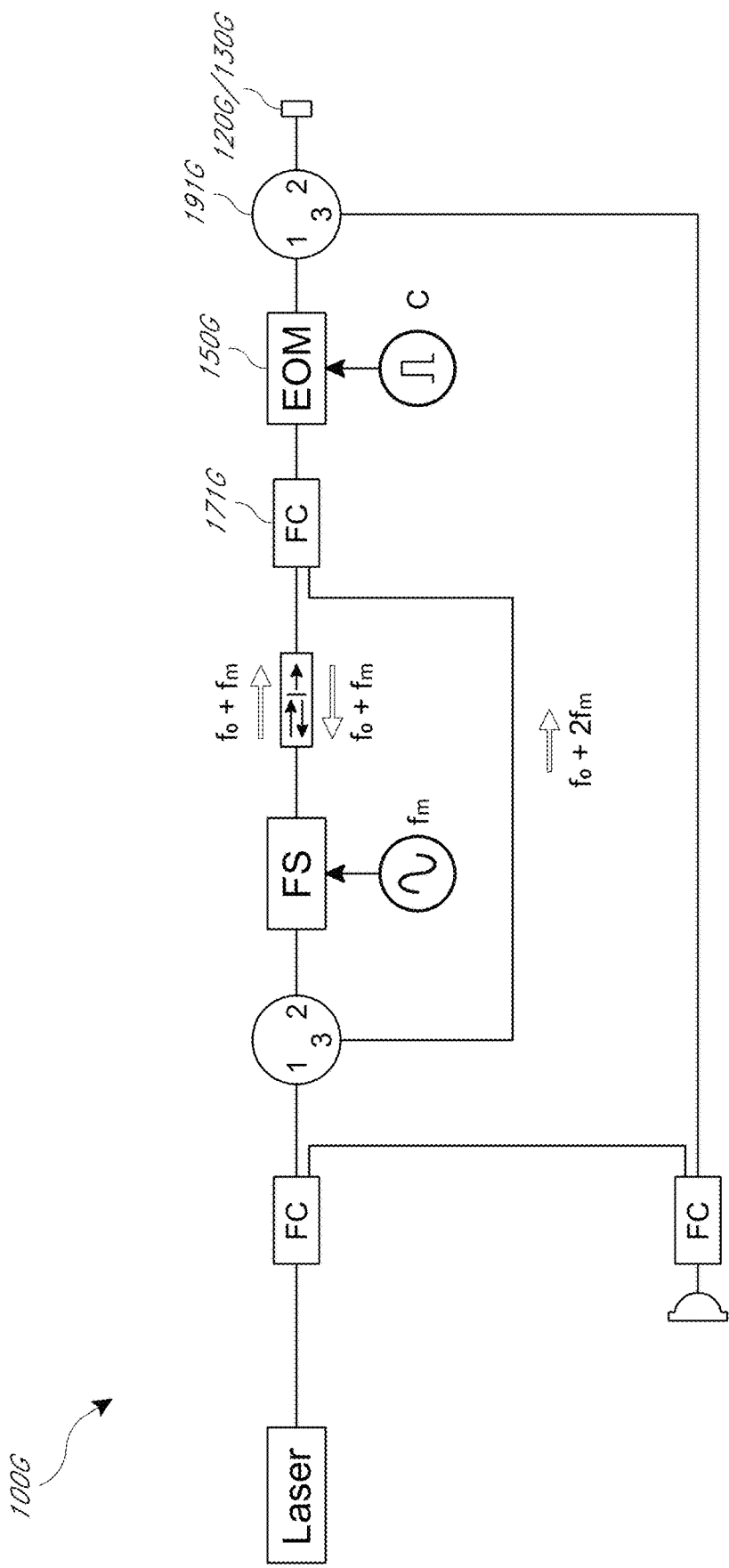

FIG. 5G depicts an embodiment lidar sensor 100G similar to the lidar sensor 100E in FIG. 5E, but providing both the first and second portions with the same code. As shown, a single phase modulator 150G can be provided downstream from the second fiber coupler 171G, between the fiber coupler and a second optical circulator 191G just before the transceiver 120G/130G, such that both portions receive the same code.

Figure 5H:
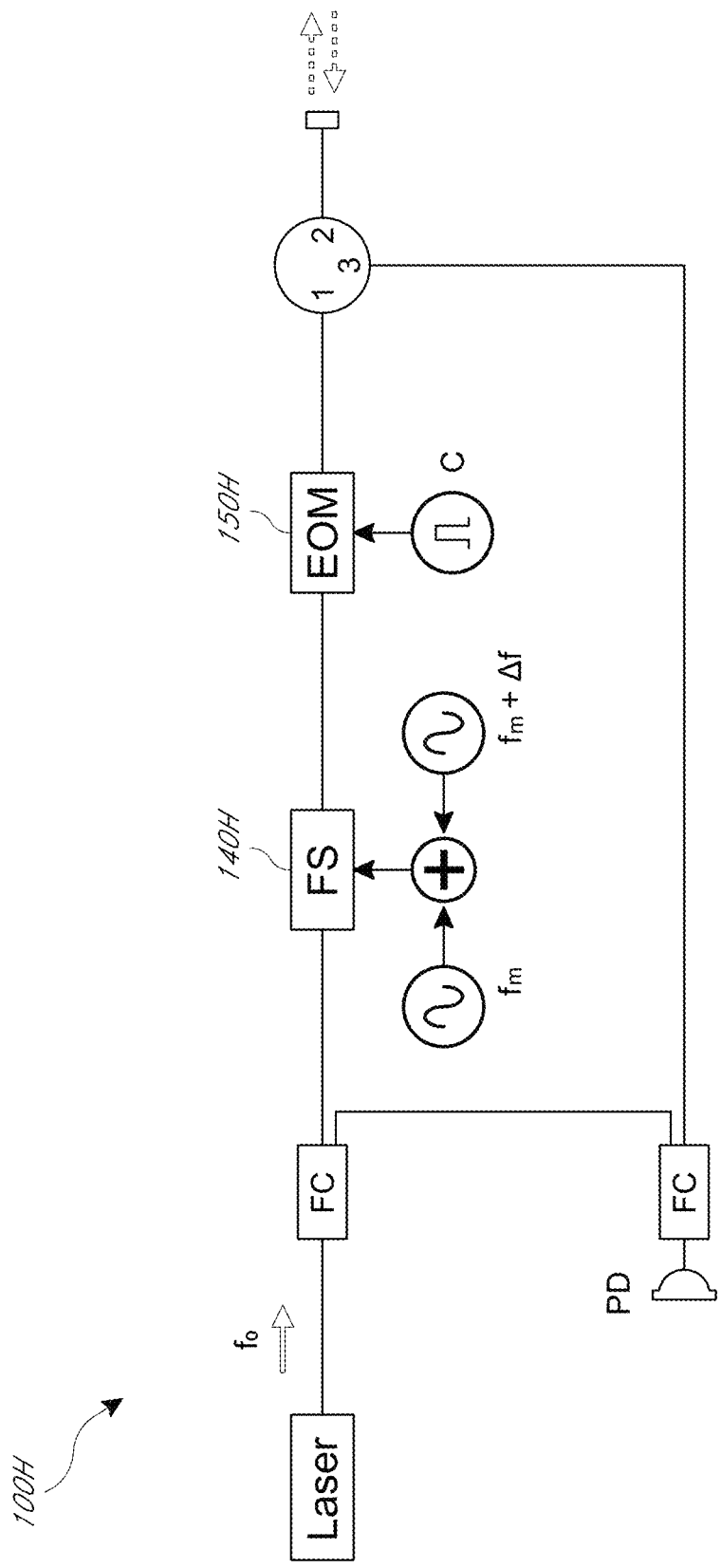

FIG. 5H depicts an embodiment lidar sensor 100H that is further simplified to only include one frequency shifter 140H and one phase modulator 150H, with one portion of the initial beam of light remaining unshifted. Instead, the initial beam of light from the laser 110H is split only once at the first fiber coupler 170H, into a transmitted portion and an internal portion. The transmitted portion is directed to a frequency shifter 140H that, unlike the previously described embodiments, provides two superimposed frequency modulations onto the transmitted portion. As shown, frequencies of $f_m$ and $f_m+\Delta f$ are used to shift the transmitted portion (starting with a frequency of $f_0$). Thus, a combined beam can then be generated having a frequency of $\Delta f$. The combined beam can then be directed to the phase modulator 150H, which applies a single code prior to passing the beam along toward the transceiver 120H/130H. Thus, using a combined frequency $\Delta f$ and a single code, the analysis of the reflected beam can be similar to those discussed above.

Thus, a variety of different lidar sensors are possible and other combinations and permutations of the embodiments described above will be understood to one of skill in the art as part of the disclosure herein.

Figure 6A:
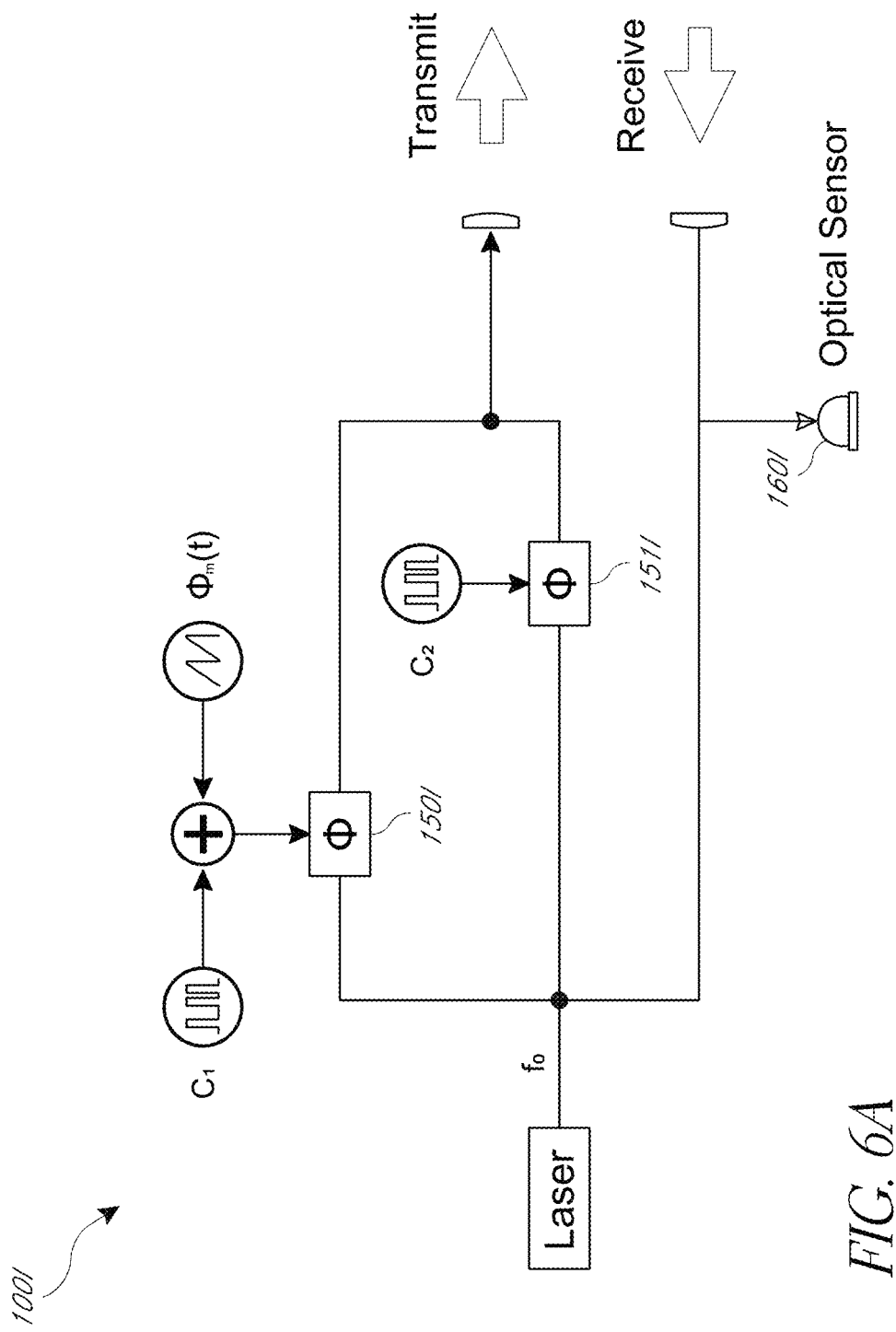
FIGS. 6A-6C depict various lidar systems using coherent detection and superhomodyne techniques.
Figure 6B:
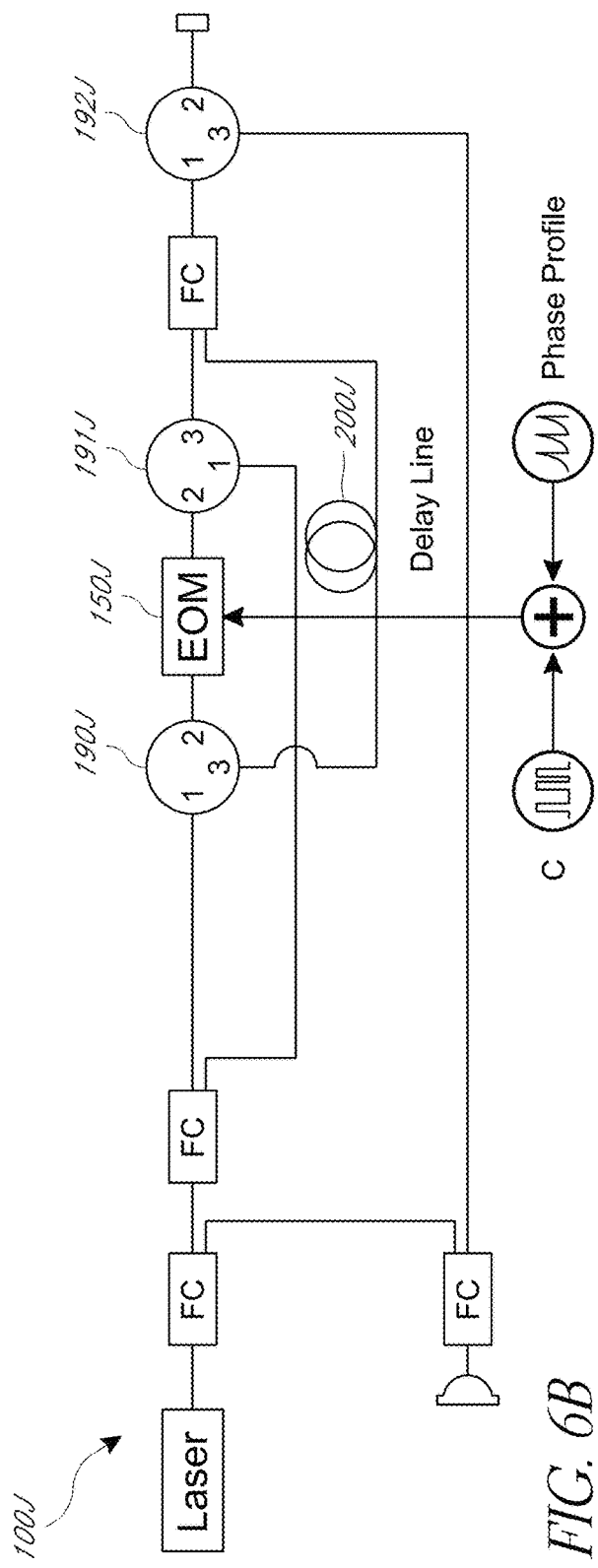
Figure 6C:
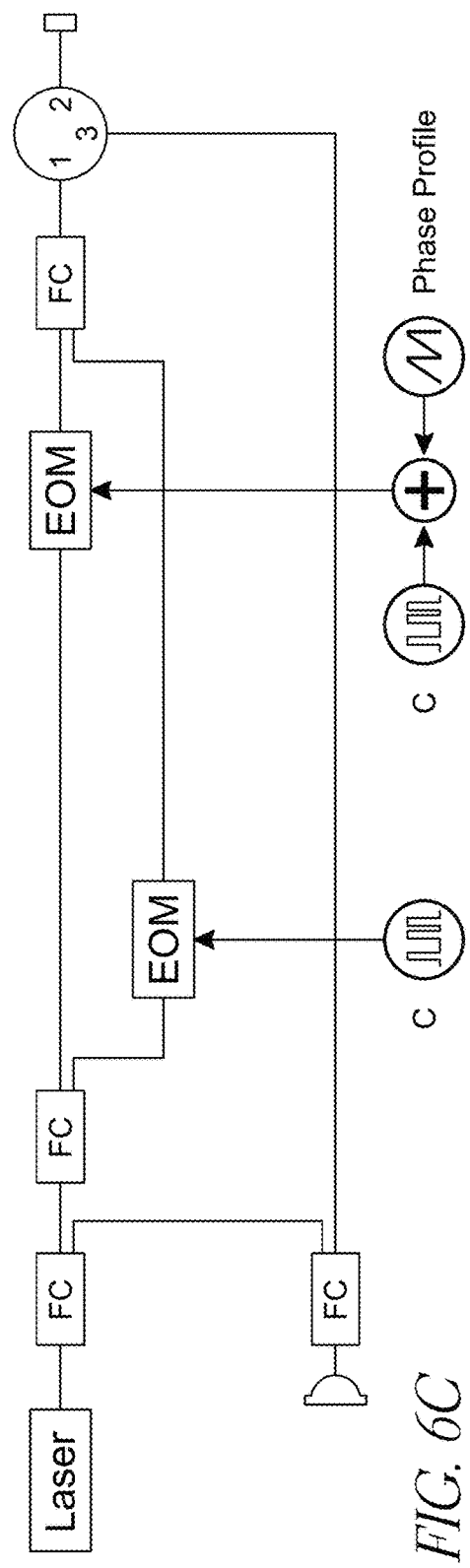

In addition to the superheterodyne lidar sensors described above, superhomodyne lidar sensors can also be used to measure the phase of the reflected light from the direct current ("DC") signal it generates on an optical sensor. FIGS. 6A-6C depict different lidar sensors using these techniques, with certain components being similar to those in FIGS. 5A-5H unless otherwise stated.

FIG. 6A depicts a lidar sensor 100I with a layout and mode of operation substantially similar to the lidar sensor 100A in FIG. 5A, but without frequency shifters. Additionally, the lidar sensor 100I can include phase modulators 150I, 151I that provide a different code $c_1$ to the first portion of the initial beam of light to be transmitted. As shown, the code $c_1$ can be the combination of a "bar code" (such as that described previously and shown as a pseudo-random noise code in FIG. 7A) and a periodic pattern such as sawtooth phase modulation depicted in FIG. 7A, yielding the combined code $c_1$ depicted in FIG. 7A. Again, the codes $c_1$ and $c_2$ can be orthogonal to each other. Further variations on these codes are also possible. For example, the periodic pattern can be a linear sawtooth, quadratic sawtooth, cubic sawtooth, sinusoidal, or have some other profile.

After the combined signal with the codes $c_1$ and $c_2$ has been transmitted, reflected, and received, the codes can be used to identify the time of transmission of a received reflected beam. Similar analysis can also be applied to the received signal as in the superheterodyne process described above, such as Doppler frequency estimation and tracking, and comparing the phase of the received beam with the transmitted beam to reduce noise.

The reflected beam received by the lidar sensor in FIG. 6A can also be used to measure a variety of features relating to an object at the point of reflection, as discussed in other embodiments above. However, there can be some differences.

For example, in the previously described method the distance can be determined using the difference in phases of the light fields of the transmitted and received reflected beams (after demodulating the received reflected beam to remove the codes). Although that previously described method could also potentially be used in the system of FIG. 6A, use of the periodicity of the sawtooth ramp code is described here. The relative phase $\Phi_r$ measured at the optical sensor 1801 at time t is equal to the phase of the modulation ramp at a time t−2L/c:

$$\Phi_r(t)=\Phi_m(t-2L/c)$$

where L is the distance to the object and c is the speed of light. The time of flight 2L/c and thus the distance LL can be derived by simply inverting the phase of the modulation ramp code $\Phi_m$. Similarly, the radial velocity of the point of reflection can be computed using the difference in phases of the transmitted and received reflected beams after decoding. The angular velocity can be computed using similar methods to those discussed above.

The reflected beam can also be used to measure a reflectivity of the object at the point of reflection. The quadrature amplitude of the DC signal resulting from the reflected beam at the optical sensor can be compared with experimental results at comparable distances, using look-up tables for example, to determine a reflectivity.

Further, reducing the slope of the sawtooth phase profile at the modulator allows mapping of the surface microscopic profile of the target object onto the measured phase of the light.

Figure 7B:
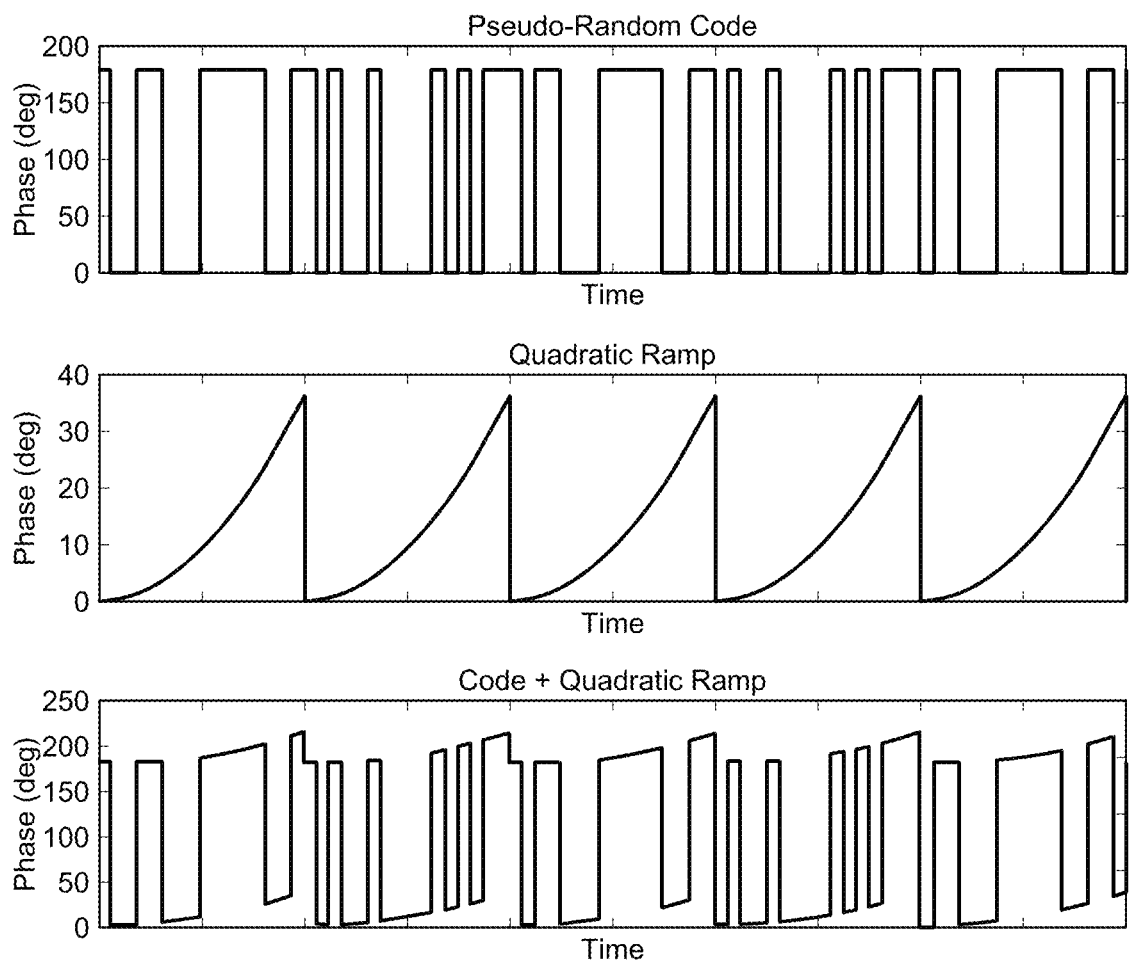

Further variations on the design of the lidar sensor 100I are also possible, as shown in FIGS. 6B and 6C, which can be similar to the embodiment in FIG. 6A unless indicated to the contrary, with similar names and reference numbers indicating similar components. For example, as shown in FIG. 6B, the lidar sensor 100J can include only one phase modulator 150J. A first portion of the initial beam of light can pass through the phase modulator 150J and three optical circulators 190J, 191J, 192J, as in FIG. 6A. A second portion of the initial beam of light can be directed through the phase modulator 150J in a reverse direction and then directed through an optional delay line 200J using the first optical circulator 190J. This delay can lead the second portion to have a code that is orthogonal to the first portion's code when they are recombined. It should be noted that this lidar 100J is substantially similar to the lidar 100B depicted in FIG. 5B (without a frequency shifter). The phase modulation provided by the phase modulator 150J can optionally include a pseudo-random binary code combined with a parabolic sawtooth pattern, as depicted in FIG. 7B.

FIG. 6C depicts an embodiment lidar sensor 100K similar to the lidar sensor 100I in FIG. 6A, with some minor differences. For example, a transceiver 120K/130K can replace the separate components in FIG. 6A.

As in the superheterodyne examples depicted in FIGS. 5A-5H, additional variations on the superhomodyne lidar sensors can also be provided. For example, the first portion and second portion can be separated using fiber-optic fiber couplers or partially-reflective in-line retroreflectors. These can be routed along separate paths or can be combined in a single path. They can also optionally be provided with the same code.

Figure 9:
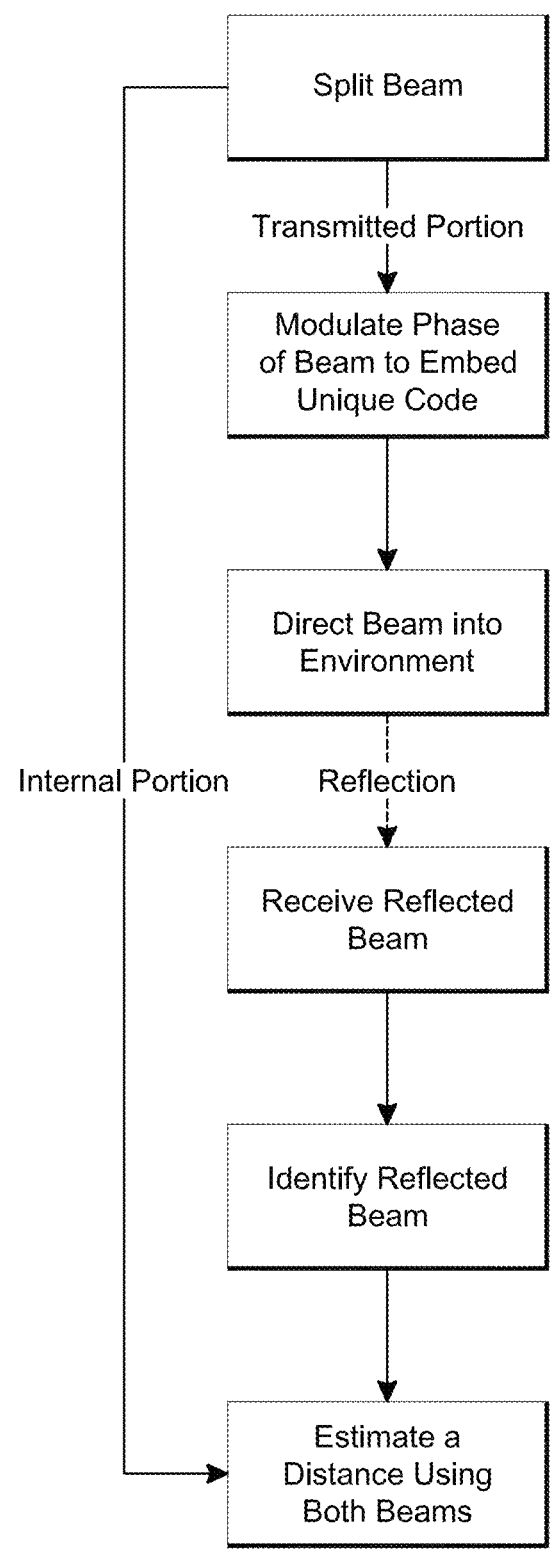
FIG. 9 depicts a method for estimating a distance using a lidar sensor.
Figure 10:
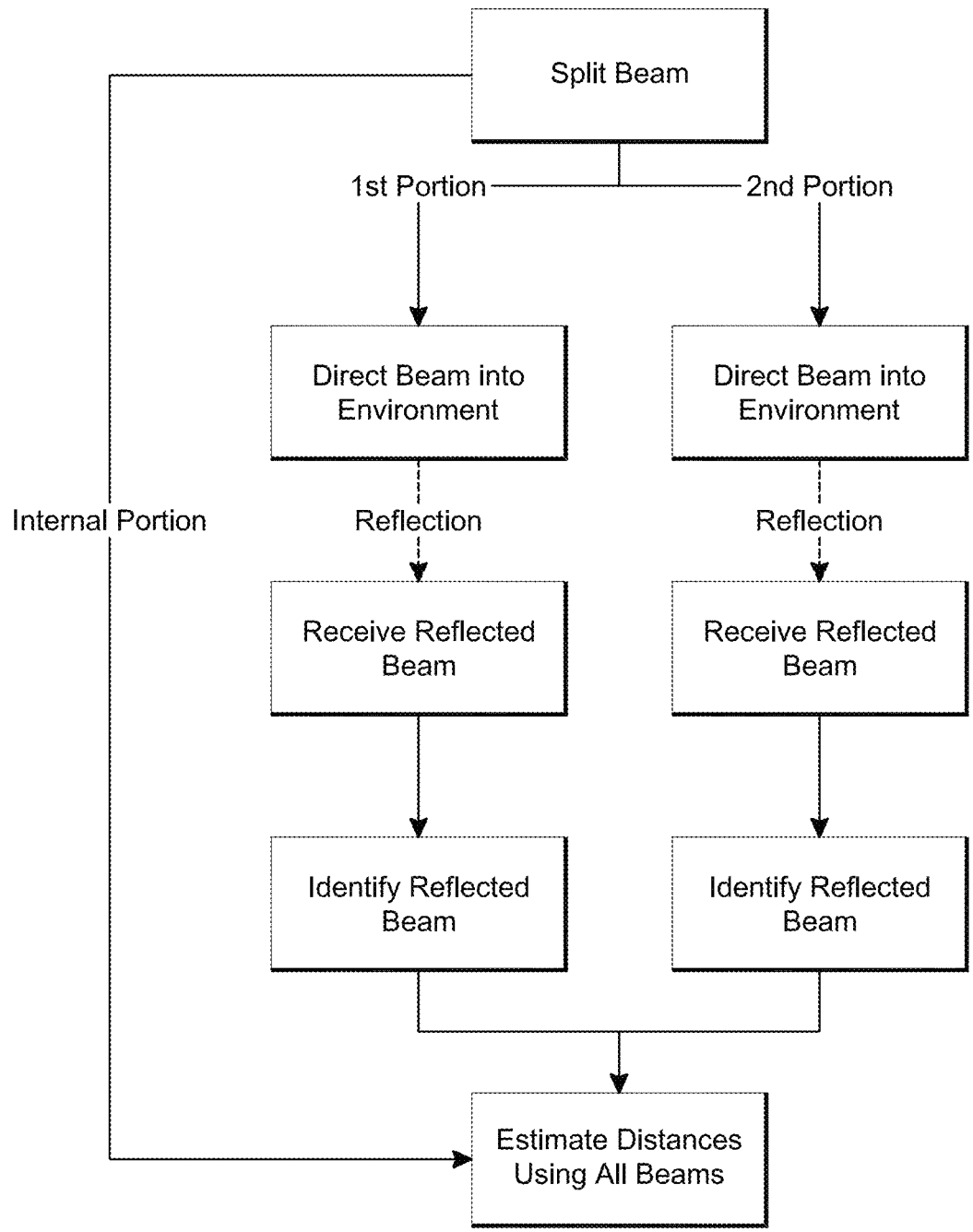
FIG. 10 depicts a method for detecting multiple distances simultaneously.
Figure 11:
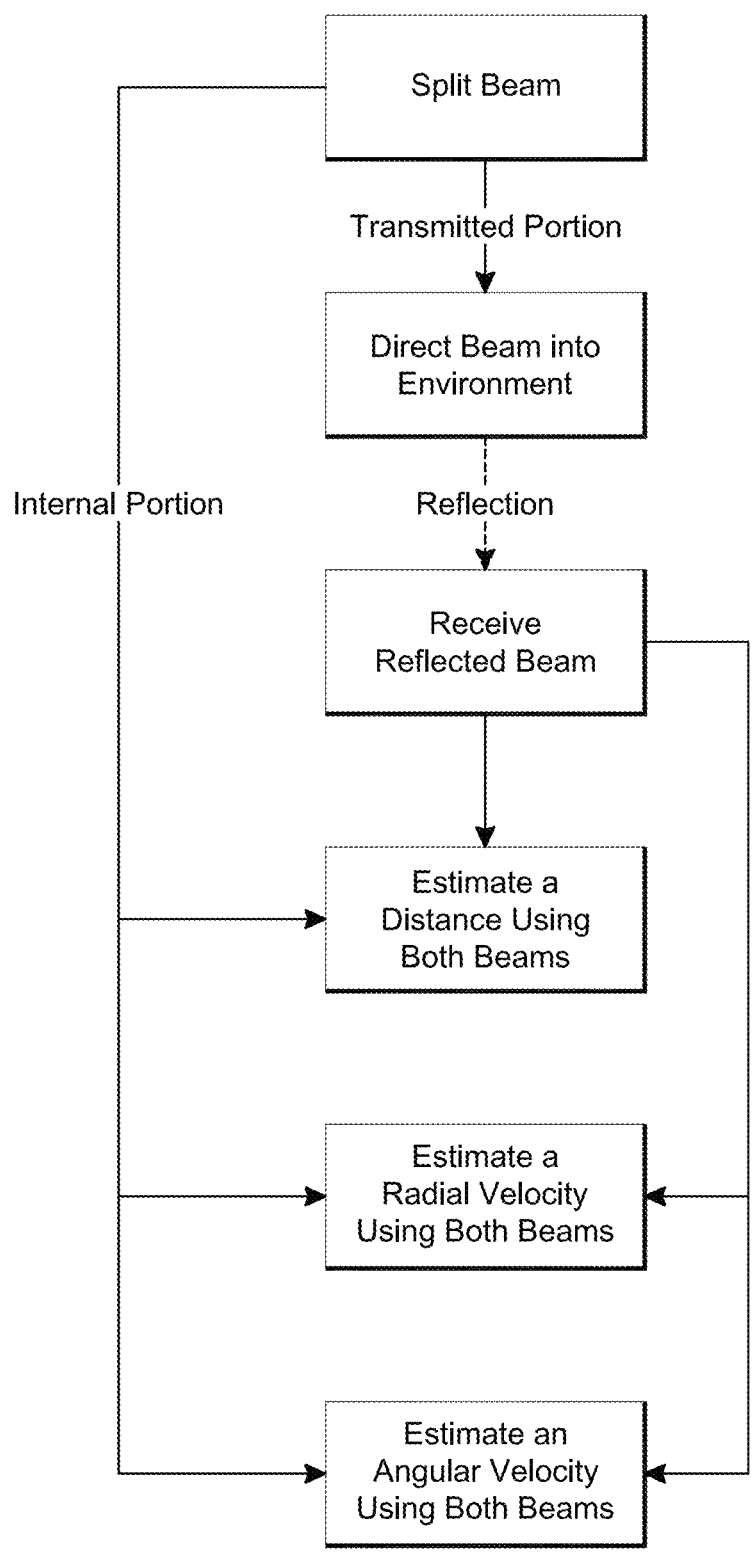
FIG. 11 depicts a method for measuring a distance, radial velocity, and angular velocity.

FIGS. 9-11 depict various methods for measuring distances, which can be optionally implemented using the systems described above. As shown in FIG. 9, an initial beam (such as a beam generated from a laser 110) can be split into a transmitted portion and an internal portion. The transmitted portion can have its phase modulated to embed a unique code (as discussed above) prior to being directed into the environment. The received reflected beam resulting from the transmitted portion can then be identified by detecting the unique code. The distance to a point of reflection can then be estimated using the reflected beam and the internal portion.

The method depicted in FIG. 10 is substantially similar to that in FIG. 9, but shows that two separate transmitted portions can be used to detect distances simultaneously. The method depicted in FIG. 11 is also similar to that in FIGS. 9 and 10, but shows that multiple values can be estimated, such as the radial and angular velocities, in addition to the distance.

According to one embodiment, the techniques described herein (such as for measuring distances, velocities, and reflectivities) are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
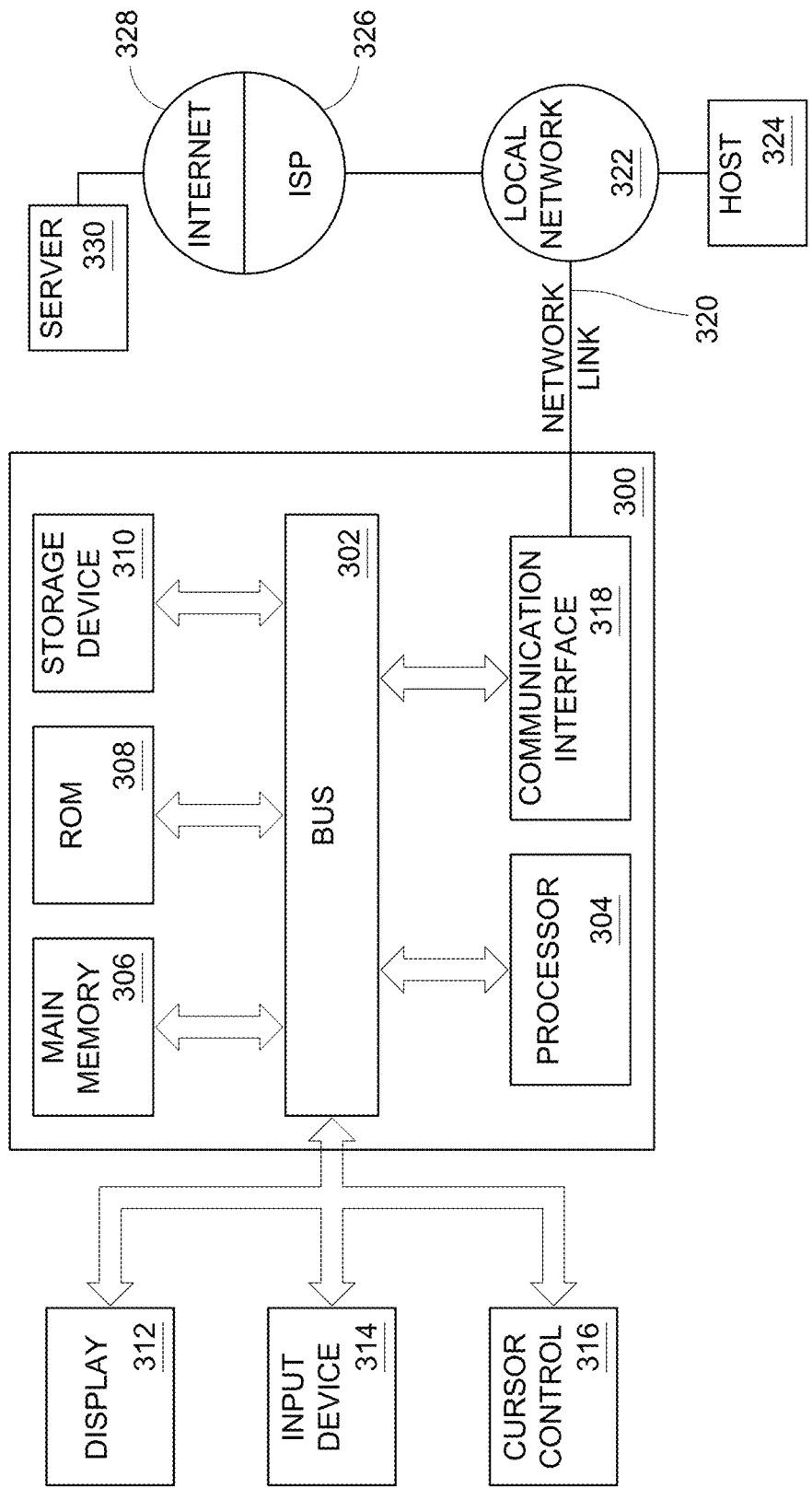
FIG. 8 depicts a computer system.

FIG. 8 is a block diagram that illustrates an example computer system with which an embodiment may be implemented. In the example of FIG. 3, a computer system 300 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 300 includes an input/output (I/O) subsystem 302 which may include a bus and/or other communication mechanism(s) for communicating information and/or instructions between the components of the computer system 300 over electronic signal paths. The I/O subsystem 302 may include an I/O controller, a memory controller and at least one I/O port. The electronic signal paths are represented schematically in the drawings, for example as lines, unidirectional arrows, or bidirectional arrows.

At least one hardware processor 304 is coupled to I/O subsystem 302 for processing information and instructions. Hardware processor 304 may include, for example, a general-purpose microprocessor or microcontroller and/or a special-purpose microprocessor such as an embedded system or a graphics processing unit (GPU) or a digital signal processor or ARM processor. Processor 304 may comprise an integrated arithmetic logic unit (ALU) or may be coupled to a separate ALU.

Computer system 300 includes one or more units of memory 306, such as a main memory, which is coupled to I/O subsystem 302 for electronically digitally storing data and instructions to be executed by processor 304. Memory 306 may include volatile memory such as various forms of random-access memory (RAM) or other dynamic storage device. Memory 306 also may be used for storing temporary variables or other intermediate information during execution of instructions to be executed by processor 304. Such instructions, when stored in non-transitory computer-readable storage media accessible to processor 304, can render computer system 300 into a special-purpose machine that is customized to perform the operations specified in the instructions.

Computer system 300 further includes non-volatile memory such as read only memory (ROM) 308 or other static storage device coupled to I/O subsystem 302 for storing information and instructions for processor 304. The ROM 308 may include various forms of programmable ROM (PROM) such as erasable PROM (EPROM) or electrically erasable PROM (EEPROM). A unit of persistent storage 310 may include various forms of non-volatile RAM (NVRAM), such as FLASH memory, or solid-state storage, magnetic disk or optical disk such as CD-ROM or DVD-ROM, and may be coupled to I/O subsystem 302 for storing information and instructions. Storage 310 is an example of a non-transitory computer-readable medium that may be used to store instructions and data which when executed by the processor 304 cause performing computer-implemented methods to execute the techniques herein.

The instructions in memory 306, ROM 308 or storage 310 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 300 may be coupled via I/O subsystem 302 to at least one output device 312. In one embodiment, output device 312 is a digital computer display. Examples of a display that may be used in various embodiments include a touch screen display or a light-emitting diode (LED) display or a liquid crystal display (LCD) or an e-paper display. Computer system 300 may include other type(s) of output devices 312, alternatively or in addition to a display device. Examples of other output devices 312 include printers, ticket printers, plotters, projectors, sound cards or video cards, speakers, buzzers or piezoelectric devices or other audible devices, lamps or LED or LCD indicators, haptic devices, actuators or servos.

At least one input device 314 is coupled to I/O subsystem 302 for communicating signals, data, command selections or gestures to processor 304. Examples of input devices 314 include the optical sensors and other sensors described herein, and potentially other devices such as touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 316, which may perform cursor control or other automated control functions such as navigation in a graphical interface on a display screen, alternatively or in addition to input functions. Control device 316 may be a touchpad, a mouse, a trackball, or cursor direction keys for communicating direction information and command selections to processor 304 and for controlling cursor movement on display 312. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 314 may include a combination of multiple different input devices, such as a video camera and a depth sensor.

In another embodiment, computer system 300 may comprise an internet of things (IoT) device in which one or more of the output device 312, input device 314, and control device 316 are omitted. Or, in such an embodiment, the input device 314 may comprise one or more cameras, motion detectors, thermometers, microphones, seismic detectors, other sensors or detectors, measurement devices or encoders and the output device 312 may comprise a special-purpose display such as a single-line LED or LCD display, one or more indicators, a display panel, a meter, a valve, a solenoid, an actuator or a servo.

When computer system 300 is a mobile computing device, input device 314 may comprise a global positioning system (GPS) receiver coupled to a GPS module that is capable of triangulating to a plurality of GPS satellites, determining and generating geo-location or position data such as latitude-longitude values for a geophysical location of the computer system 300. Output device 312 may include hardware, software, firmware and interfaces for generating position reporting packets, notifications, pulse or heartbeat signals, or other recurring data transmissions that specify a position of the computer system 300, alone or in combination with other application-specific data, directed toward host 324 or server 330.

Computer system 300 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 300 in response to processor 304 executing at least one sequence of at least one instruction contained in main memory 306. Such instructions may be read into main memory 306 from another storage medium, such as storage 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 310. Volatile media includes dynamic memory, such as memory 306. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 302. Transmission media can also take the form of acoustic or light waves, such as those generated during radio-wave and infra-red data communications.

Various forms of media may be involved in carrying at least one sequence of at least one instruction to processor 304 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 300 can receive the data on the communication link and convert the data to a format that can be read by computer system 300. For instance, a receiver such as a radio frequency antenna or an infrared detector can receive the data carried in a wireless or optical signal and appropriate circuitry can provide the data to I/O subsystem 302 such as place the data on a bus. I/O subsystem 302 carries the data to memory 306, from which processor 304 retrieves and executes the instructions. The instructions received by memory 306 may optionally be stored on storage 310 either before or after execution by processor 304.

Computer system 300 also includes a communication interface 318 coupled to bus 302. Communication interface 318 provides a two-way data communication coupling to network link(s) 320 that are directly or indirectly connected to at least one communication networks, such as a network 322 or a public or private cloud on the Internet. For example, communication interface 318 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 322 broadly represents a local area network (LAN), wide-area network (WAN), campus network, internetwork or any combination thereof. Communication interface 318 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 318 sends and receives electrical, electromagnetic or optical signals over signal paths that carry digital data streams representing various types of information.

Network link 320 typically provides electrical, electromagnetic, or optical data communication directly or through at least one network to other data devices, using, for example, satellite, cellular, Wi-Fi, or BLUETOOTH technology. For example, network link 320 may provide a connection through a network 322 to a host computer 324.

Furthermore, network link 320 may provide a connection through network 322 or to other computing devices via internetworking devices and/or computers that are operated by an Internet Service Provider (ISP) 326. ISP 326 provides data communication services through a world-wide packet data communication network represented as internet 328. A server computer 330 may be coupled to internet 328. Server 330 broadly represents any computer, data center, virtual machine or virtual computing instance with or without a hypervisor, or computer executing a containerized program system such as DOCKER or KUBERNETES. Server 330 may represent an electronic digital service that is implemented using more than one computer or instance and that is accessed and used by transmitting web services requests, uniform resource locator (URL) strings with parameters in HTTP payloads, API calls, app services calls, or other service calls. Computer system 300 and server 330 may form elements of a distributed computing system that includes other computers, a processing cluster, server farm or other organization of computers that cooperate to perform tasks or execute applications or services. Server 330 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 330 may comprise a web application server that hosts a presentation layer, application layer and data storage layer such as a relational database system using structured query language (SQL) or no SQL, an object store, a graph database, a flat file system or other data storage.

Computer system 300 can send messages and receive data and instructions, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage 310, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 304. While each processor 304 or core of the processor executes a single task at a time, computer system 300 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

Figure 1:
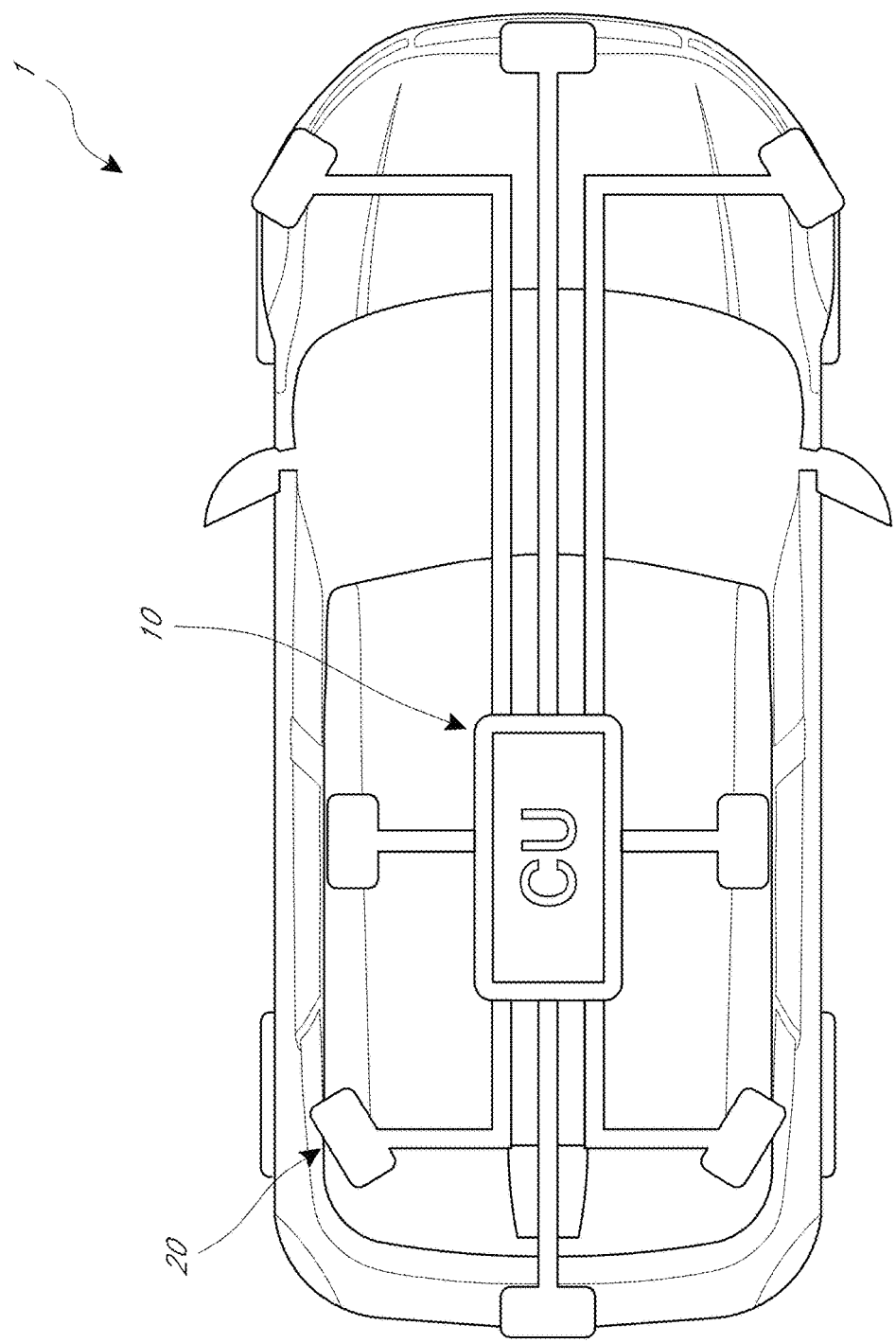
FIG. 1 is a system diagram of an embodiment perception system.

Further variations of lidar sensor systems and methods of using the same are possible as described herein. As described above with respect to FIG. 1, a perception system, e.g., for an automobile, can include a plurality of probes 20, each of which can in turn include one or more lidar sensors. The probes may be connected to a central unit 10. As shown, different ones of the probes 20 may be configured to sense, among other things, distances of objects in different directions. In some embodiments, a lidar sensor may employ a light source, e.g., a laser that is configured to emit a monochromatic beam of light at a single wavelength. However, in some implementations, it may be more advantageous to employ a light source that is configured to emit light having multiple discrete wavelengths. For example, when a source light having a single wavelength is used in conjunction with multiple transceivers, the optical efficiency of sensing may degrade. In these and various other circumstances, the inventors have discovered that various advantages, including improved sensor efficiency and compact hardware, can be synergistically realized when the various lidar sensor designs described herein are implemented with a light source configured to provide beams of light having multiple wavelengths, as described in the following. In the following, it will be understood that, while the concept of using a light source having multiple wavelengths may be described in conjunction with arrangements of components that may be similar to some implementations of lidar sensors described above, it may be implemented in conjunction with arrangements of components that may be similar to any other implementations of lidar sensors described above, in which similar names and reference numbers indicate similar components. As such, a detailed description of various arrangements of components according to some implementations of lidar sensors that can be integrated with a light source configured to provide a source light having multiple wavelengths may be omitted for brevity without loss of enabling their implementations.

Figure 12:
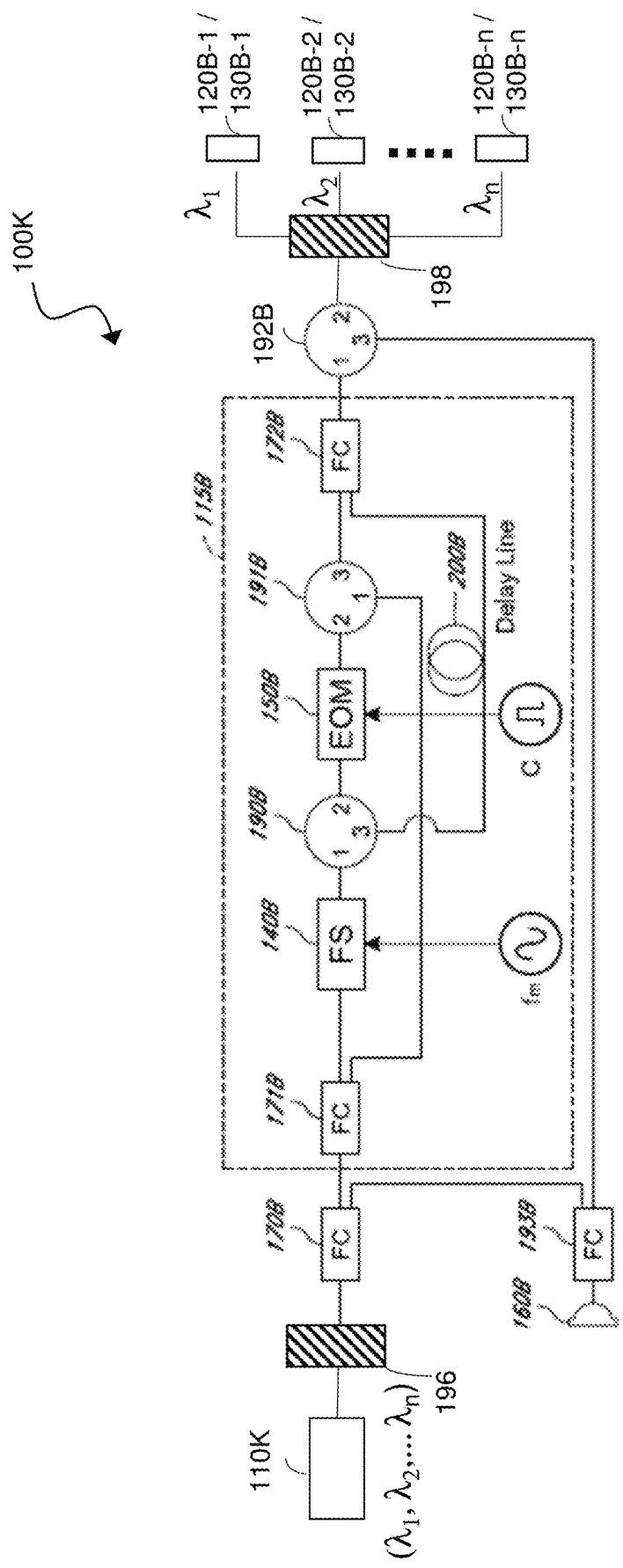
FIG. 12 illustrates a lidar system having a light source configured to generate a source light having multiple wavelengths and an optical circuit configured to embed a code in the source light for detection of object distances.

FIG. 12 illustrates a lidar sensor 100K configured to sense object distances using a source light having multiple wavelengths, according to some embodiments. The lidar sensor 100K includes a light source 110K configured to generate a source light having multiple different wavelengths $\lambda_1, \lambda_2, \ldots \lambda_n$. The lidar sensor 100K additionally includes an optical synthesizer circuit 115B. The optical synthesizer circuit 115B is configured to receive a portion of the source light comprising light beams having different wavelengths. The optical synthesizer circuit 115B comprises a phase modulator 150B configured to embed a unique code into at least one of the light beams, in similar manner as describe according to various embodiments described above. The lidar sensor 100K further includes one or more transceivers 120B-1/130B-1, 120B-2/130B-2, ... 120B-n/130B-n configured to receive from the optical synthesizer circuit 115B at least one of code-embedded light beams having different wavelengths, to direct the at least one of the code-embedded light beams into an environment, and to receive at least one of reflected light beams from objects reflecting the at least one of the code-embedded light beams. As configured, the lidar sensor 100K is configured to detect distances between the objects and the transceivers using the at least one of the reflected light beams.

In some implementations, the light source 110K can be a light source, e.g., a laser, configured to emit a source light comprising light beams having multiple wavelengths in any one or more of the visible, infrared or ultraviolet spectra. Without limitation, the different wavelengths may include n number of wavelengths within a range of 1500 nm-1600 nm or 1530 nm-1570 nm, where the different wavelengths may differ from each other by at least 1 nm, e.g., 1-5 nm. In some other implementations, the light source 110K can include multiple lasers configured to emit at wavelengths that are different from each other. In these implementations, the source light including multiple light beams having different wavelengths may initially pass through a wavelength splitter 196 or a demultiplexer (DMUX) to be combined into a single light beam before being received by the optical synthesizer circuit 115B. The n number of wavelengths can be, without limitation, any number between 1 and 40, inclusive. As described herein, an optical synthesizer circuit refers to an optical circuit optically connected to a light source and a transmitter, receiver or a transceiver. Examples of optical synthesizer circuits include various optical synthesizer circuits described above with respect to FIGS. 5A-5H and 6A-6C.

Still referring to FIG. 12, the optical synthesizer circuit 115B is configured to embed one or more unique codes into the portion of the source light fed thereinto, which can in turn be split into further portions, as described above according to some embodiments. In the particular embodiment illustrated in FIG. 12, in a similar manner as described above with respect to FIG. 5B, the source light emitted by the light source 110K can optionally encounter a wavelength splitter 196 or a DMUX, followed by a first fiber coupler 170B. The first fiber coupler 170B can split direct an internal portion of the source light toward an optical sensor 160B, and direct a remaining portion of the source light to an optical synthesizer circuit 115B. The optical synthesizer circuit 115B includes at least one phase modulator (depicted as an electro-optic modulator, "EOM," although other phase modulators are also possible including, but not limited to dual-parallel Mach-Zehnder interferometers) 150B, which is configured to apply a code to the portion of the source light fed into the optical synthesizer circuit 115B comprising light beams having different wavelengths. The optical synthesizer circuit 115B may optionally include at least one frequency shifter 140B (for instance an acousto-optic modulator, "AOM," although other frequency shifters are also possible) to adjust the frequency of the portion of the source light fed into the optical synthesizer circuit 115B comprising light beams having different wavelengths. The optical synthesizer circuit 115B can include a second fiber coupler 171B configured to split the portion of the source light fed into the optical synthesizer circuit 115B into first and second portions for transmission. The first portion can proceed directly to the frequency shifter 140B, followed by a phase modulator 150B, followed by one or more transceivers 120B-1/130B-1, 120B-2/130B-2, . . . 120B-n/130B-n in a substantially similar manner as described above.

Still referring to FIG. 12, the lidar sensor 100K can include a first optical circulator 190B between the frequency shifter 140B and the phase modulator 150B, a second optical circulator 191B between the phase modulator and a third fiber coupler 172B, and a third optical circulator 192B between the third fiber coupler 172B and the transceivers 120B-1/130B-1, 120B-2/130B-2, . . . 120B-n/130B-n. The second portion split from the second fiber coupler 171B can be directed to the second optical circulator 191B, such that it passes through the phase modulator 150B in reverse order relative to the first portion split from the second fiber coupler 171B. The second portion can then be directed by the first optical circulator 190B to an optional delay line 200B, followed by the third fiber coupler 172B. The first portion and the second portion can be combined by the third fiber coupler 171B (serving as a combiner). Thus, both the first portion and the second portion split from the second fiber coupler 171B can be embedded with the unique code before being transmitted to the one or more transceivers 120B-1/130B-1, 120B-2/130B-2, . . . 120B-n/130B-n, in a substantially similar manner as described above.

In various embodiments, when there are n number of light beams having different wavelengths in the source light, at least two of the light beams can each be embedded with the unique code. In some embodiments, all of the light beams having different wavelengths can be embedded with the unique code. However, embodiments are not so limited, and in other embodiments, a subset of the light beams having different wavelengths can be embedded with the unique code.

The code provided by the phase modulator 150B can be unique, such as with a pseudo-random code as described above (although different types of codes from spread spectrum theory can be used). This code can be sufficiently random such that a delay provided by the delay line 200B can shift the codes applied to the first and second portions of the beam of light sufficiently for the two codes to be substantially orthogonal to each other. Thus, the processing of signals from the lidar sensor 100K can be substantially similar to the lidar sensors described above, e.g., with respect to FIG. 5A, with the exception that $f_2$ is zero. Nevertheless, $f_1$ can optionally be adjusted in a similar manner to achieve the desired ambiguity range for the measured distance as discussed above with respect to FIG. 5A.

Still referring to FIG. 12, the lidar sensor 100K further includes one or more transceivers 120B-1/130B-1, 120B-2/130B-2, . . . 120B-n/130B-n configured to receive from the optical synthesizer circuit 115B at least one of the code-embedded light beams. When there are n number of code-embedded light beams having different wavelengths, the lidar sensor 100K may include a corresponding n number of transceivers 120B-1/130B-1, 120B-2/130B-2, . . . 120B-n/130B-n. In the illustrated embodiment, the code-embedded light beams having different wavelengths can be split into individual wavelengths $\lambda_1, \lambda_2, \ldots \lambda_n$ by the wavelength combiner-splitter 198 or a multiplexer (MUX)-demultiplexer (DMUX) (serving as a splitter or DMUX). After being split into light beams having single wavelengths, the individual ones of the code-embedded light beams are fed into corresponding ones of the transceivers 120B-1/130B-1, 120B-2/130B-2, . . . 120B-n/130B-n, which in turn direct the code-embedded light beams into an environment. At least some of the code-embedded light beams directed to the environment can be reflected by object(s), and the transceivers 120B-1/130B-1, 120B-2/130B-2, . . . 120B-n/130B-n are configured to receive at least one of reflected light beams from the object(s) reflecting the at least one of the code-embedded light beams. One or more reflected light beams may then be received by the one or more transceivers 120B-1/130B-1, 120B-2/130B-2, . . . 120B-n/130B-n, which may be combined by the combiner-splitter 198 or MUX-DMUX (now serving as a combiner or MUX). The combined reflected light beam(s) may then be received by a third optical circulator 192B, which in turn directs the reflected light beam(s) to a fourth fiber coupler 193B. The fourth fiber coupler 193B combines the reflected light beam(s) and the internal portion of the source light split from the second fiber coupler 170B, and directs them to the optical sensor 160B, in a similar manner as described above, for identifying the reflected light beams and for detecting the distances of the object(s) in the environment.

In the illustrated embodiment in FIG. 12, each of the transceivers 120B-1/130B-1, 120B-2/130B-2, . . . 120B-n/130B-n serve as both a transmitter and an emitter. However, embodiments are not so limited, and as described above with respect to FIG. 5A, the lidar sensor 100K can have separate transmitters 120B-1, 120B-2, . . . 120B-n, and receivers 130B-1, 130B-2, . . . 130B-n. When separate transmitters and receivers are present, after the code-embedded light beams are directed to the environment using transmitters 120B-1, 120B-2, . . . 120B-n, the reflected light beams may be received by the separate receivers 130B-1, 130B-2, . . . 130B-n and directed to the optical sensor 160B thorough a different path, as shown in FIG. 5A, which may include a separate combiner-splitter.

Advantageously, the inventors have discovered that, by using light beams having different wavelengths as shown in FIG. 12, the sensor efficiency and signal-to-noise ratio may be significantly improved. In addition, because the same optical synthesizer circuit is used to embed a unique code into light beams having different wavelengths, compact hardware can be synergistically realized, among other advantages.

Figure 13:
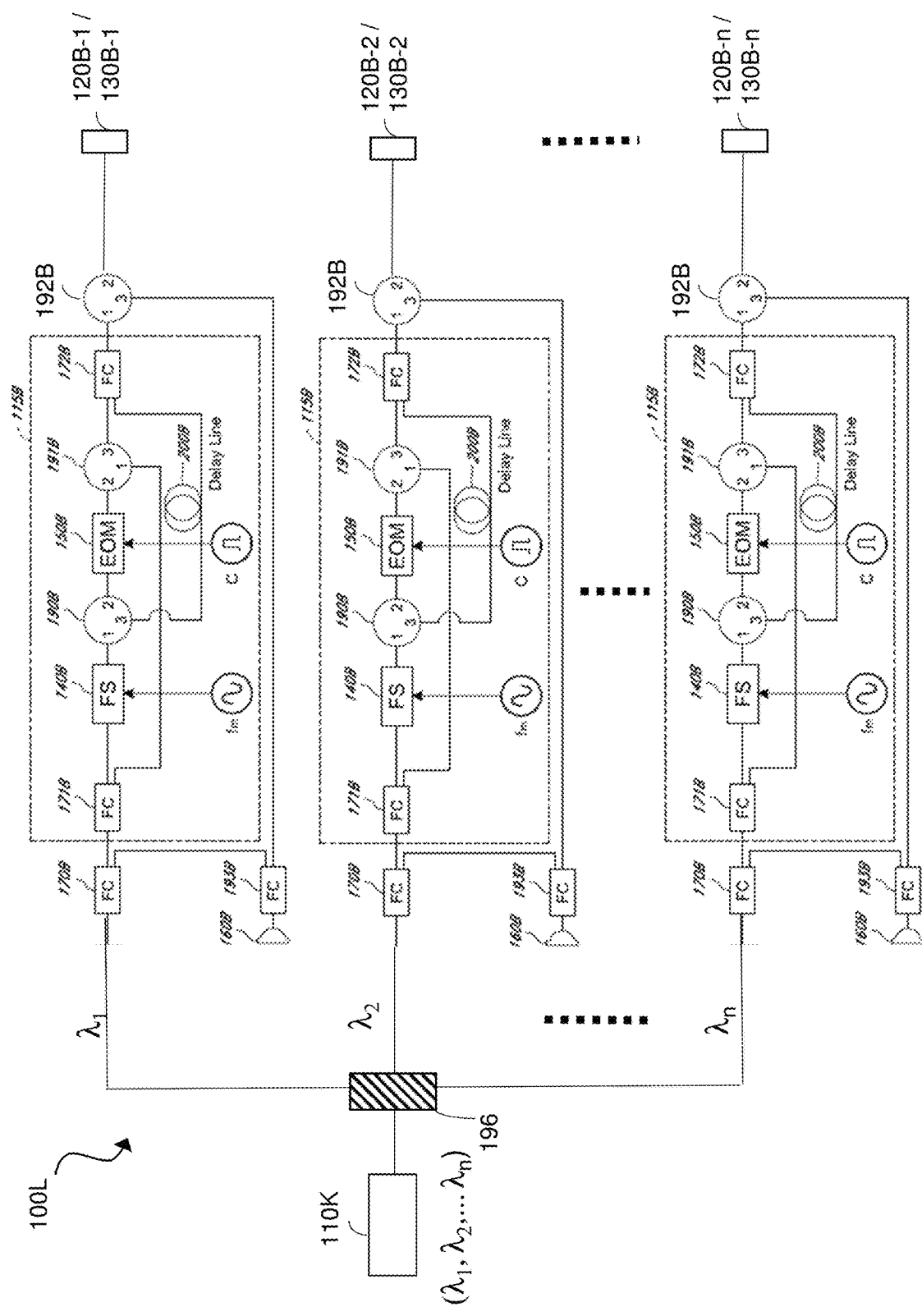
FIG. 13 illustrates a lidar system having a light source configured to generate a source light having multiple wavelengths and optical circuits configured to embed a code in the source light for detection of object distances.
Figure 14:
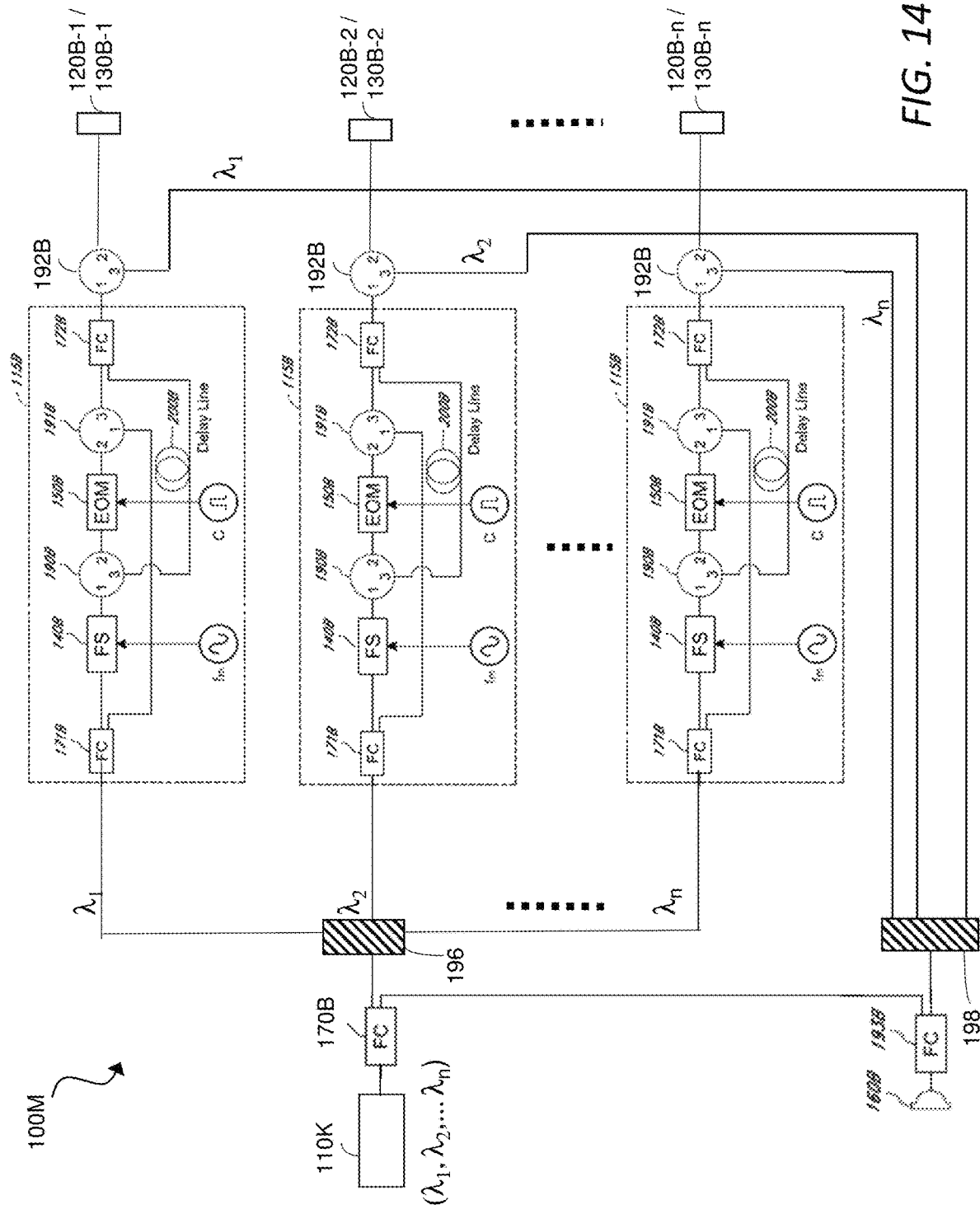
FIG. 14 illustrates a lidar system having a light source configured to generate a source light having multiple wavelengths and optical circuits configured to embed a code in the source light for detection of object distances.

FIGS. 13 and 14 illustrate lidar sensors 100L, 100M configured to sense object distances using a source light having multiple wavelengths, according to some other embodiments. Various components of the lidar sensors 100L, 100M are similar or analogous to the corresponding components described above with respect to FIG. 12 As such, a detailed description of the similar or analogous components is omitted herein for brevity.

The lidar sensors 100L, 100M include a light source 110K configured to generate a source light having different wavelengths $\lambda_1, \lambda_2, \ldots \lambda_n$. Similar to that described above with respect to FIG. 12. Unlike the lidar sensor described above with respect to FIG. 12 in which the same optical synthesizer circuit is used to embed a unique code into multiple light beams having different wavelengths, each of the lidar sensors 100L, 100M includes a plurality of optical synthesizer circuits 115B, where each of the optical synthesizer circuits 115B is configured to receive a portion of one of the light beams having one of the wavelengths $\lambda_1, \lambda_2, \ldots \lambda_n$. In a similar manner as described above with respect to FIG. 12, each of the optical synthesizer circuits 115B includes a phase modulator 150B configured to embed a unique code into the portion of the one of the light beams fed thereinto. The lidar sensor 100L additionally includes a plurality of transceivers 120B-1/130B-1, 120B-2/130B-2, ... 120B-n/130B-n each configured to receive from a respective one of the optical synthesizer circuits 115B one of code-embedded light beams, to direct the one of the code-embedded light beams into an environment, and to receive a reflected light beam from an object reflecting the one of the code-embedded light beams. The lidar sensors 100L, 100M are configured, for each of the transceivers, to detect a distance between the object and the transceiver using the reflected light beam.

Now more in particular reference to the lidar sensor 100L illustrated in FIG. 13, when the light source 110K is configured to emit a source light comprising light beams having multiple wavelengths, e.g., a multi-wavelength laser, the source light from the light source 110K may initially pass through a wavelength splitter 196 to split the source light into multiple light beams having different wavelengths for feeding into the respective ones of the optical synthesizer circuits 115B. However, different from as shown in FIG. 13, when the light source 110K comprises multiple light sources each configured to emit a light beam at a wavelength, e.g., multiple lasers configured to emit at different wavelengths, each light source may feed a light beam having a wavelength directly into a respective one of the optical synthesizer circuit 115B.

Still referring to FIG. 13, each of the light beams having one of the wavelengths $\lambda_1, \lambda_2, \ldots \lambda_n$ is fed into a respective one of the synthesizer circuits 115B, and thereafterwards, a unique code is embedded thereto, in a substantially similar manner as described above, e.g., with respect to FIGS. 5B and 12. Thereafterwards, n number of code-embedded light beams may be fed into a corresponding one of n number of transceivers 120B-1/130B-1, 120B-2/130B-2, ... 120B-n/130B-n. Unlike the embodiment described above with respect to FIG. 12, the individual ones of the code-embedded light beams having discrete wavelengths are fed into corresponding ones of the transceivers 120B-1/130B-1, 120B-2/130B-2, ... 120B-n/130B-n, which in turn direct the code-embedded light beams into an environment. At least some of the code-embedded light beams directed to the environment can be reflected by objects, and thereafterwards received by a corresponding ones of the third optical circulators 192B, which is combined with the internal portion of the source light split from the first fiber coupler 170B, before being directed to corresponding ones of the optical sensors 160B, in a similar manner as described above with respect to FIGS. 5B and 12.

Now in reference to FIG. 14, the lidar sensor 100M is similar to the lidar sensor 100L described above with respect to FIG. 13 except, instead of each of the light beams having one of wavelengths $\lambda_1, \lambda_2, \ldots \lambda_n$ being split into a portion fed into an optical synthesizer circuit 115B and an internal portion by a first fiber coupler 170B after the source light is separated into individual light beams each having a single wavelength, in the lidar sensor 100M, the first fiber coupler 170B is positioned between the light source 110K and the splitter 196. As positioned, the first fiber coupler 170B is configured to separate the source light, having multiple wavelengths, into portions fed into the optical synthesizer circuits 115B and a common internal portion that is transmitted directly to the fourth fiber coupler 193B followed by the optical sensor 160B. In addition, unlike the lidar sensor 100L described above with respect to FIG. 13, after the code-embedded light beams are directed to the environment and reflected by objects, all of the reflected beams having different wavelengths $\lambda_1, \lambda_2, \ldots \lambda_n$ are directed into a combiner 198, before being combined with the common internal beam from the first fiber coupler 170B by the fourth fiber coupler 193B, and before being received by a common optical sensor 160B.

Thus, in the illustrated lidar sensors 100L, 100M in FIGS. 13 and 14, the portions of the source light beams having different wavelengths that are fed into corresponding ones of the optical synthesizer circuits can be embedded with a unique code in corresponding ones of the optical synthesizer circuits. In some embodiments, all of the light beams having different wavelengths can be embedded with the same unique code by the optical synthesizer circuits. However, embodiments are not so limited, and in other embodiments, the light beams having different wavelengths can be embedded with different unique codes.

In the illustrated lidar sensors in FIGS. 13 and 14, each of the transceivers 120B-1/130B-1, 120B-2/130B-2, ... 120B-n/130B-n serve as both a transmitter and an emitter. However, embodiments are not so limited, and as described above with respect to FIG. 5A, the lidar sensor 100K can have separate transmitters 120B-1, 120B-2, ... 120B-n and corresponding receivers 130B-1, 130B-2, ... 130B-n. When separate transmitters and receivers are present, after the code-embedded light beams are directed to the environment using transmitters 120B-1, 120B-2, ... 120B-n, the reflected light beams may be received by the separate receivers 130B-1, 130B-2, ... 130B-n and directed to the optical sensor 160B thorough a different path, as shown in FIG. 5A, which may include a separate combiner-splitter.

Advantageously, the inventors have discovered that, by using light beams having different wavelengths as shown in FIGS. 13 and 14, the sensor efficiency and signal-to-noise ratio may be significantly improved, among other improvements. In addition, because different optical synthesizer circuits are used to embed a unique code into light beams having different wavelengths, the flexibility of embedding same or different codes into the light beams can be synergistically realized, among other advantages.

While the inventive concepts of using a light source having multiple wavelengths have been described in reference to lidar sensors in FIGS. 12-14 that are implemented with an optical synthesizer circuit 115B similar to the optical synthesizer circuit 115B described above with respect to FIG. 5B, embodiments are not limited. It will be appreciated that the concept of using a light source having multiple wavelengths can be readily implemented in conjunction with any other lidar sensor arrangements described above with respect to FIGS. 5A-5H and 6A-6C, in which similar names and reference numbers may indicate similar components. For example, the optical synthesizer circuits 192B described above with respect to FIGS. 12-14 may be replaced or used in conjunction with any of the corresponding optical synthesizer circuits described above with respect to FIGS. 5A-5H and 6A-6C. For example, the optical synthesizer circuit 115B may employ any of the configurations for embedding a unique code into a portion of the source light fed thereinto and/or for further splitting the portion of the source light into two or more parts, among other various modifications to the light passing therethrough. Furthermore, the concepts of using a light source having multiple wavelengths described in reference to FIGS. 12-14 can be implemented in conjunction with any of the codes, systems and methods described throughout the application, including FIGS. 7A-11.

Some additional example embodiments are described in view of the following clauses:

Clause 1. A lidar sensor comprising:
  an optical sensor configured to produce signals based at least on receiving one or more beams of light;
  a laser configured to emit an initial beam of light, a first portion of the initial beam of light being directed into the environment and an internal portion of the initial beam of light being directed to the optical sensor, wherein the optical sensor is configured to receive both the internal portion of the initial beam of light and a first reflected beam of light resulting from the first portion of the initial beam of light being reflected at a first point of reflection in the environment;
  a processor configured to:
    receive signals from the optical sensor;
    identify the first reflected beam of light as having resulted from the first portion of the initial beam of light;
    determine a distance to the point of reflection based at least on the first reflected beam of light and the internal portion of the initial beam of light;
    determine a radial velocity of the point of reflection relative to the lidar sensor based at least on a time derivative of a difference in phases of the light field between the first reflected beam of light and the internal portion of the initial beam of light; and
    determine an angular velocity of the point of reflection relative to the lidar sensor based at least on a Doppler shift of the first reflected beam of light and the determined radial velocity.

Clause 2. The lidar sensor of clause 1, further comprising an phase modulator configured to modulate a phase of the first portion of the initial beam of light over a period of time with a unique code to embed the unique code into a modulated phase of the first portion of the initial beam of light prior to it being directed into the environment.

Clause 3. The lidar sensor of clause 2, wherein the determined distance is based at least on a time of return of the first reflected beam of light using at least the unique code.

Clause 4. The lidar sensor of clause 1, wherein the lidar sensor is configured to accurately determine distances over 10 meters.

Clause 5. The lidar sensor of clause 4, wherein the lidar sensor is configured to accurately determine distances over 100 meters.

Clause 6. A lidar sensor comprising:
  a laser configured to emit an initial beam of light;
  a first fiber coupler in optical communication with the laser to receive and divide the initial beam of light into a transmitted portion and an internal portion;
  an optical synthesizer circuit in optical communication with the first fiber coupler to receive the transmitted portion of the initial beam of light from the first fiber coupler and to adjust a phase of the transmitted portion of the initial beam of light;
  a transmitter in optical communication with the optical synthesizer circuit to receive the transmitted portion with an adjusted phase from the optical synthesizer circuit and direct the transmitted portion into the environment;
  a receiver configured to receive a reflected beam of light from the environment resulting from the transmitted portion of the initial beam of light;
  a second fiber coupler in optical communication with the receiver and the first fiber coupler to combine the reflected beam of light and the internal portion of the initial beam of light into a combined beam of light; and
  an optical sensor in optical communication with the second fiber coupler to receive the second beam of light.

Clause 7. The lidar sensor of clause 6, wherein the transmitter and receiver are a single transceiver.

Clause 8. The lidar sensor of clause 6, wherein the optical synthesizer circuit comprises one or more phase modulators, the phase modulators being configured to embed a unique code into a modulated phase of the transmitted portion of the initial beam of light.

Clause 9. The lidar sensor of clause 8, wherein the one or more phase modulators are also configured to embed a periodic pattern combined with the unique code into the modulated phase of the transmitted portion of the initial beam of light.

Clause 10. The lidar sensor of clause 6, wherein the optical synthesizer circuit further comprises at least two different optical paths and is configured to separate the transmitted portion of the initial beam of light into a first portion and a second portion along the at least two different optical paths and recombine the first portion and second portion prior to being received by the transmitter.

Clause 11. The lidar sensor of clause 10, wherein the optical synthesizer circuit comprises a third fiber coupler configured to separate the transmitted portion of the initial beam of light into the first portion and the second portion, and a fourth fiber coupler configured to recombine the first portion and the second portion prior to being received by the transmitter.

Clause 12. The lidar sensor of clause 10, wherein the optical synthesizer circuit comprises one or more phase modulators configured to embed different unique codes into modulated phases of each of the first portion and the second portion prior to being recombined.

Clause 13. The lidar sensor of clause 6, wherein the optical synthesizer circuit comprises a frequency shifter configured to adjust a frequency of the transmitted portion of the initial beam of light prior to being directed into the environment.

Clause 14. The lidar sensor of clause 6, wherein the lidar sensor is configured to accurately determine distances over 10 meters.

Clause 15. The lidar sensor of clause 14, wherein the lidar sensor is configured to accurately determine distances over 100 meters.

Clause 16. A method of operating a lidar sensor to measure a distance to an object and a velocity of the object, the method comprising:
  splitting a beam of light into a transmitted portion and an internal portion;
  directing the transmitted portion into the environment;
  receiving a reflected beam resulting from the transmitted portion being directed into the environment;
  estimating a distance to a point of reflection using the reflected beam and the internal portion;
  estimating a radial velocity of the point of reflection relative to the lidar sensor based at least on a time derivative of a difference in phases of the light field between the reflected beam of light and the internal portion; and
  estimating an angular velocity of the point of reflection relative to the lidar sensor based at least on a Doppler shift of the reflected beam and the determined radial velocity.

Clause 17. The method of clause 16, further comprising modulating a phase of the transmitted portion over a period of time with a unique code to embed the unique code into a modulated phase of the transmitted portion prior to it being directed into the environment.

Clause 18. The method of clause 17, wherein the estimated distance is determined based at least on a time of return of the reflected beam using at least the unique code.

What is claimed is:

1. A lidar system comprising:
  a lidar sensor comprising:
    an optical sensor configured to produce signals based at least on receiving one or more beams of light;
    a laser configured to emit an initial beam of light, a first portion of the initial beam of light being directed into an environment in a first direction and an internal portion of the initial beam of light being directed to the optical sensor, wherein the optical sensor is configured to receive both the internal portion of the initial beam of light and a first reflected beam of light resulting from the first portion of the initial beam of light being reflected at a first point of reflection in the environment;
    an optical element configured to divide the first portion into a first part and a second part prior to the first portion being directed into the environment;
    at least one phase modulator configured to modulate a phase of at least the first part over a period of time with a first unique code to embed the first unique code into a modulated phase of the first portion of the initial beam of light prior to the first portion being directed into the environment; and
    a transmitter configured to direct the first part and the second part to the environment.

2. The lidar system of claim 1, wherein the lidar system comprises a second phase modulator configured to modulate a phase of the second part over a period of time with a second unique code to embed the second unique code into a modulated phase of the second part prior to it being directed into the environment.

3. The lidar system of claim 1, further comprising a first optical frequency shifter configured to shift a frequency of at least the first part by a first frequency shift prior to it being directed into the environment.

4. The lidar system of claim 3, further comprising a delay line configured to delay the second part prior to it being directed into the environment.

5. The lidar system of claim 3, wherein the at least one phase modulator comprises two phase modulators, wherein each of the first part and the second part is modulated by a different one of the two phase modulators, and wherein the second part is modulated by a second unique code prior to being directed into the environment.

6. The lidar system of claim 4, wherein a same one of the at least one phase modulator is further configured to modulate a phase of the second part over the period of time with the first unique code to embed the first unique code into a modulated phase of the second part prior to it being delayed.

7. The lidar system of claim 5, further comprising a second optical frequency shifter configured to shift a frequency of the second part by a second frequency shift prior to it being directed into the environment.

8. The lidar system of claim 5, wherein the first optical frequency shifter is further configured to shift a frequency of the second part prior to it being modulated by the second unique code.

9. The lidar system of claim 3, wherein the at least one phase modulator is further configured to modulate a phase of the second part over the period of time with the first unique code to embed the first unique code into a modulated phase of the second part prior to it being directed into the environment and wherein the first optical frequency shifter is further configured to shift a frequency of the second part prior to it being modulated.

10. The lidar system of claim 8, wherein the optical element is a partial retroreflector.

11. The lidar system of claim 4, wherein the first optical frequency shifter is further configured to shift a frequency of the second part prior to it being delayed and wherein the at least one phase modulator is further configured to modulate a phase of the second part over the period of time with the first unique code to embed the first unique code into a modulated phase of the second part prior to its frequency being shifted.

12. The lidar system of claim 1, wherein the at least one phase modulator is additionally configured to modulate a phase of the first portion of the initial beam of light over the period of time with a periodic pattern to embed the periodic pattern, combined with the first unique code, into the modulated phase of the first portion of the initial beam of light prior to it being directed into the environment.

13. The lidar system of claim 1, further comprising at least one optical frequency shifter configured to shift a frequency of the first and second parts such that the first and second parts have different frequencies prior to being directed into the environment.

14. The lidar system of claim 1, wherein the laser is further configured to emit a second portion of the initial beam of light being directed into an environment in a second direction different from the first direction.

15. The lidar system of claim 14, wherein:
  the optical sensor is configured to receive a second reflected beam of light having resulted from the second portion being reflected at a second point of reflection in the environment, and
  a time duration between the first portion of the initial beam of light being directed into the environment and the first reflected beam of light being received by the optical sensor overlaps with a time duration between the second portion of the initial beam of light being directed into the environment and the second reflected beam of light being received by the optical sensor.

16. The lidar system of claim 15, comprising a second phase modulator is configured to modulate a phase of the second portion over a second period of time with a second unique code different from the first unique code to embed the second unique code into a modulated phase of the second portion of the initial beam of light prior to it being directed into the environment.

17. The lidar system of claim 1, further comprising a computing system configured to receive the signals from the optical sensor and to identify the first reflected beam of light as having resulted from the first portion based at least on detecting the first unique code, and further configured to determine a distance at least to the first point of reflection based at least on the first reflected beam of light and the internal portion of the initial beam of light.

18. The lidar system of claim 16, further comprising a computing system configured to:
receive the signals from the optical sensor;
identify the first reflected beam of light as having resulted from the first portion based at least on detecting the first unique code;
determine a distance to the first point of reflection based at least on the first reflected beam of light and the internal portion of the initial beam of light;
identify the second reflected beam of light as having resulted from the second portion based at least on detecting the second unique code; and
determine a distance to the second point of reflection based at least on the second reflected beam of light and the internal portion of the initial beam of light.

19. The lidar system of claim 17, wherein the computing system is configured to determine the distance to the first point of reflection based on at least a relative phase between the first reflected beam of light and the internal portion of the initial beam of light.

20. The lidar system of claim 17, wherein the computing system is configured to determine the distance to the first point of reflection based on at least a time of return of the first reflected beam of light using at least the first unique code.

21. The lidar system of claim 18, wherein the computing system is further configured to determine a velocity of the first point of reflection.

22. The lidar system of claim 21, wherein the velocity of the first point of reflection point is a radial velocity of the first point of reflection point relative to the lidar sensor, and wherein the computing system is configured to determine the radial velocity of the first point of based at least on a time derivative of a difference in phases of light fields associated with the first reflected beam and the internal portion.

23. The lidar system of claim 22, wherein the computing system is further configured to determine an angular velocity of the first point of the reflection based at least in part on a Doppler shift of the first reflected beam and the radial velocity.

24. The lidar system of claim 1, further comprising a receiver configured to receive at least the first reflected beam and direct the first reflected beam to the optical sensor.

25. The lidar system of claim 1, wherein the transmitter comprises a transceiver configured to:
receive the first part and the second part from an optical circulator;
direct the first part and the second part to the environment; and
receive at least the first reflected beam and direct the first reflected beam to the optical sensor.

26. The lidar system of claim 17, wherein the lidar system is configured to recombine the first part and the second part of the first portion of the initial beam prior to it being directed into the environment, and wherein the transmitter is configured to direct the first part and the second part to the environment as a combined beam.

27. The lidar system of claim 26, wherein the first reflected beam comprises a reflection of the combined beam at the first point of reflection and the computing system is configured to determine the distance to the first point of reflection based at least on a difference between a phase of a received synthetic beam associated with the reflection of the combined beam and a phase of a transmitted synthetic beam associated with the combined beam.

28. The lidar system of claim 26, wherein the first reflected beam, comprises a reflection of the combined beam at the first point of reflection and the computing system is configured to determine a velocity of the first point of reflection based at least on a time derivative of a difference between a phase of a received synthetic beam associated with the first reflected beam and a phase of a transmitted synthetic beam associated with the combined beam.

29. A lidar system comprising:
a lidar sensor comprising:
an optical sensor configured to produce signals based at least on receiving one or more beams of light;
a laser configured to emit an initial beam of light, a first portion of the initial beam of light being directed into an environment and an internal portion of the initial beam of light being directed to the optical sensor, wherein the optical sensor is configured to receive both the internal portion of the initial beam of light and a first reflected beam of light resulting from the first portion of the initial beam of light being reflected at a first point of reflection in the environment;
an optical frequency shifter configured to modulate a frequency of the first portion at a first modulation frequency and a second modulation frequency, thereby generating a dual frequency modulated beam;
a phase modulator configured to modulate a phase of the dual frequency modulated beam over a period of time with a unique code to embed the unique code into a modulated phase of the first portion of the initial beam of light prior to it being directed into the environment; and
a transmitter configured to direct the first portion to the environment.

30. The lidar system of claim 29, further comprising a computing system configured to receive the signals from the optical sensor and to identify the first reflected beam of light as having resulted from the first portion based at least on detecting the unique code, and further configured to determine a distance at least to the first point of reflection based at least on the first reflected beam of light and the internal portion of the initial beam of light.

* * * * *